(12) United States Patent
Yamanaka et al.

(10) Patent No.: US 11,765,289 B2
(45) Date of Patent: Sep. 19, 2023

(54) OPERATION ASSISTANCE SYSTEM FOR IMAGE FORMING APPARATUS, OPERATION ASSISTANCE METHOD, AND COMPUTER-READABLE RECORDING MEDIUM RECORDING OPERATION ASSISTANCE PROGRAM

(71) Applicant: SHARP KABUSHIKI KAISHA, Sakai (JP)

(72) Inventors: Takashi Yamanaka, Sakai (JP); Kohji Katamoto, Sakai (JP); Yuriko Terada, Sakai (JP); Megumi Ido, Sakai (JP); Masao Saeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 1 day.

(21) Appl. No.: 17/563,746

(22) Filed: Dec. 28, 2021

(65) Prior Publication Data

US 2022/0232135 A1 Jul. 21, 2022

(30) Foreign Application Priority Data

Jan. 21, 2021 (JP) .................................. 2021-008116

(51) Int. Cl.
*G06F 15/00* (2006.01)
*H04N 1/00* (2006.01)

(52) U.S. Cl.
CPC ....... *H04N 1/00503* (2013.01); *H04N 1/0048* (2013.01); *H04N 1/00079* (2013.01); *H04N 1/00307* (2013.01); *H04N 1/00427* (2013.01)

(58) Field of Classification Search
CPC ........... H04N 1/00503; H04N 1/00079; H04N 1/00307; H04N 1/00427; H04N 1/0048
USPC .......................................... 358/444
See application file for complete search history.

(56) References Cited

U.S. PATENT DOCUMENTS

2015/0052480 A1\* 2/2015 Shin ...................... G06F 3/1285
715/810
2020/0192261 A1\* 6/2020 Ogata ................ G03G 15/5062

FOREIGN PATENT DOCUMENTS

JP 2016-192739 A 11/2016

\* cited by examiner

*Primary Examiner* — Mark R Milia
(74) *Attorney, Agent, or Firm* — ScienBiziP, P.C.

(57) ABSTRACT

In an operation assistance system, an operation assistance method, and a computer-readable recording medium recording an operation assistance program, each of which assists with making an operation setting of an image forming apparatus by using a mobile communication terminal, the mobile communication terminal wirelessly communicates with the image forming apparatus, and at least two types of setting items among plural types of the setting items for the image forming apparatus are simultaneously set by a single touch operation on an operation screen of the mobile communication terminal.

10 Claims, 30 Drawing Sheets

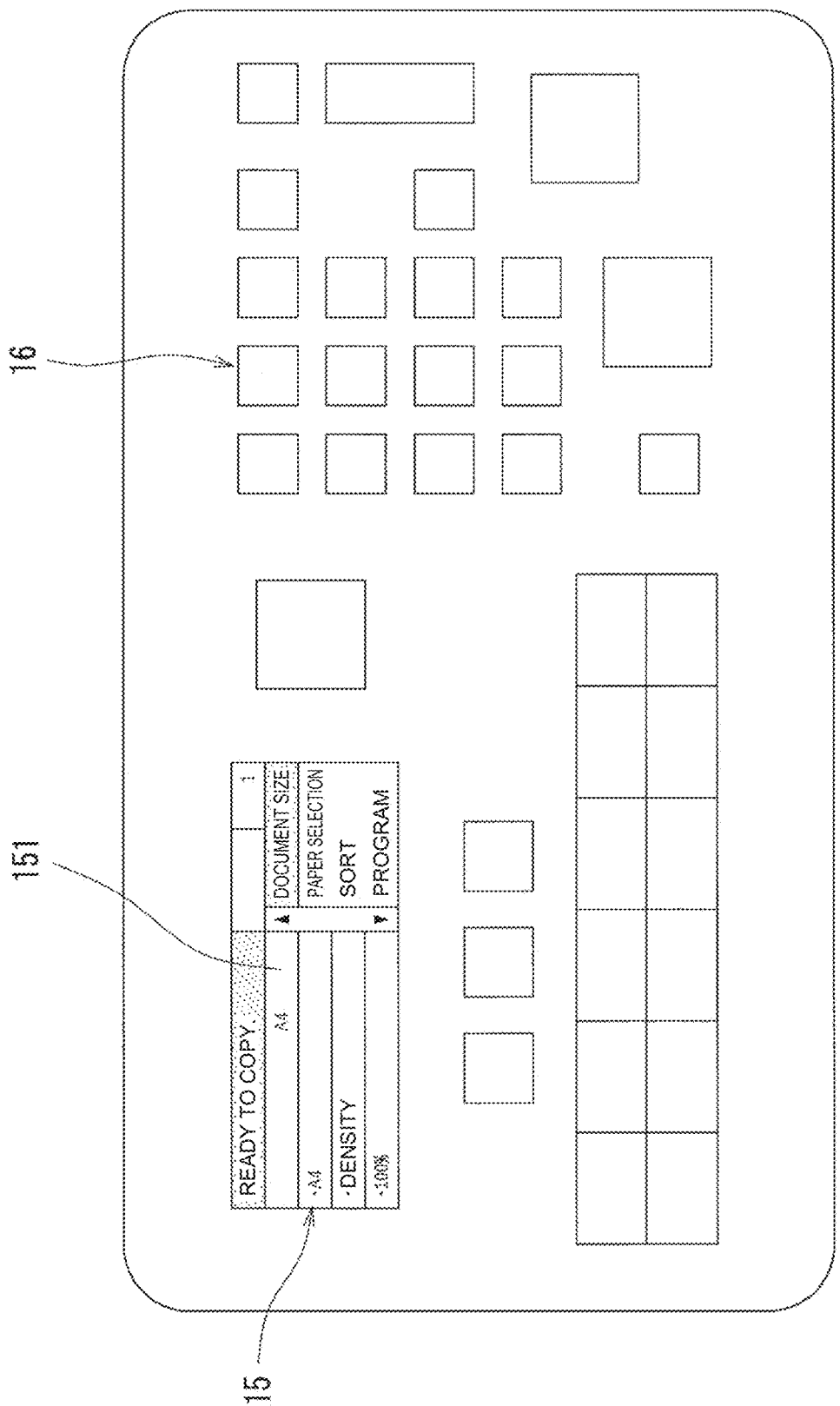

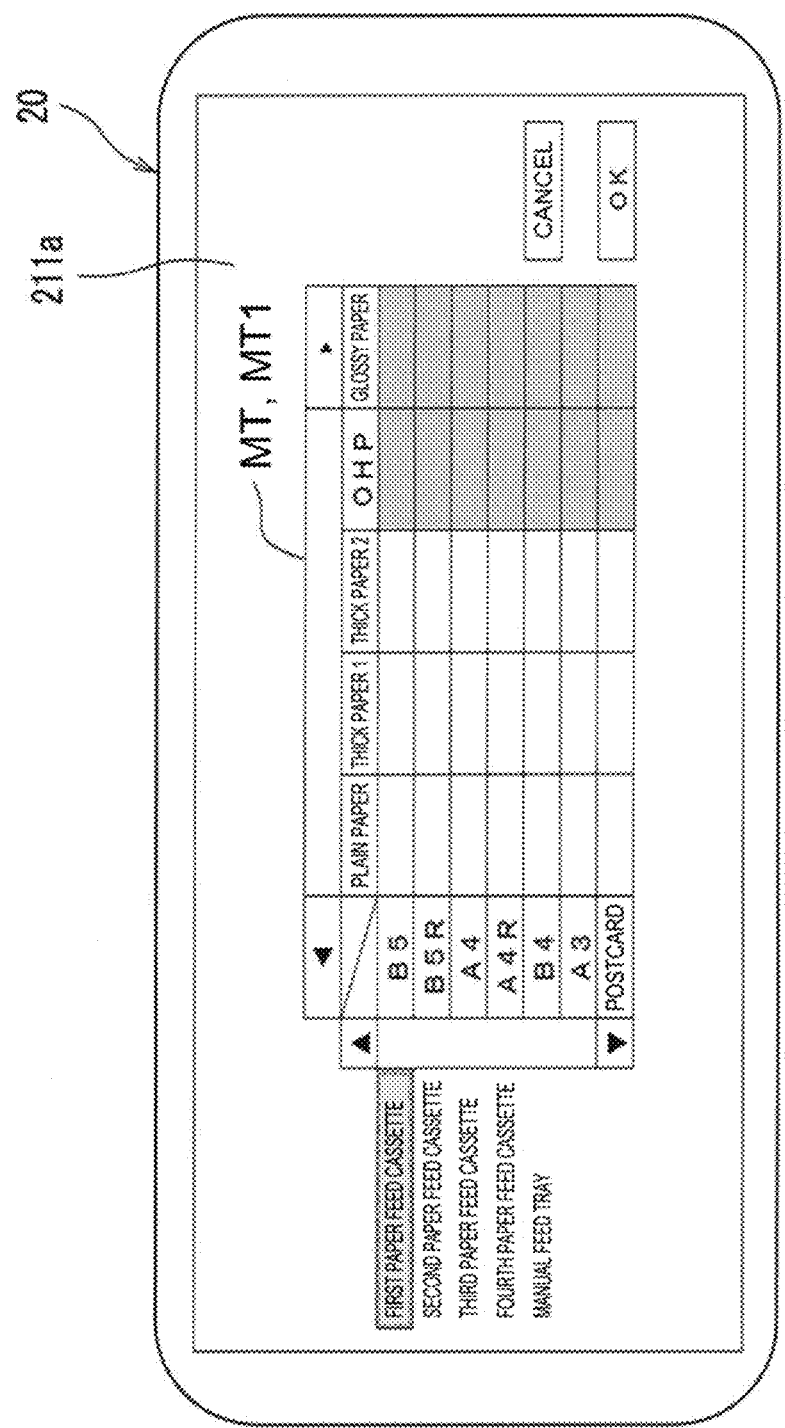

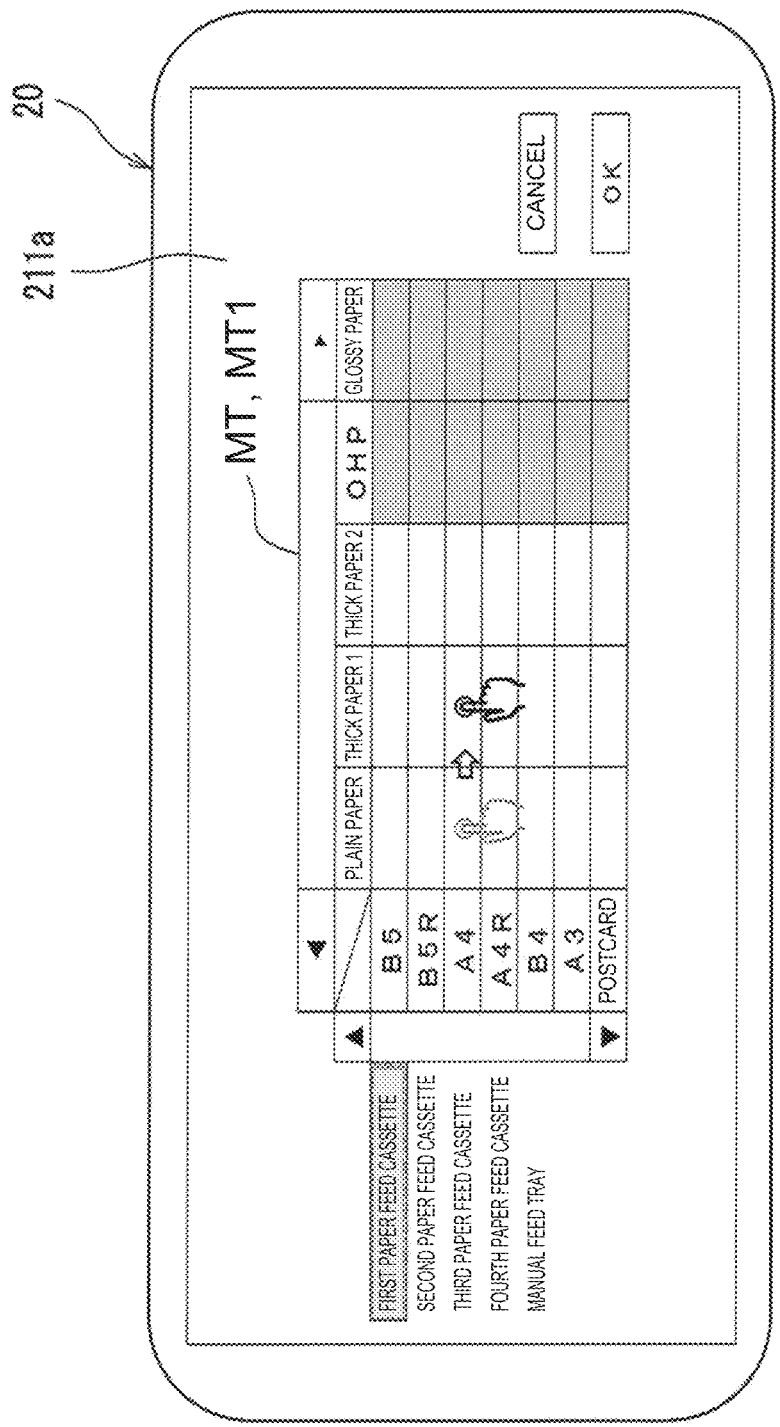

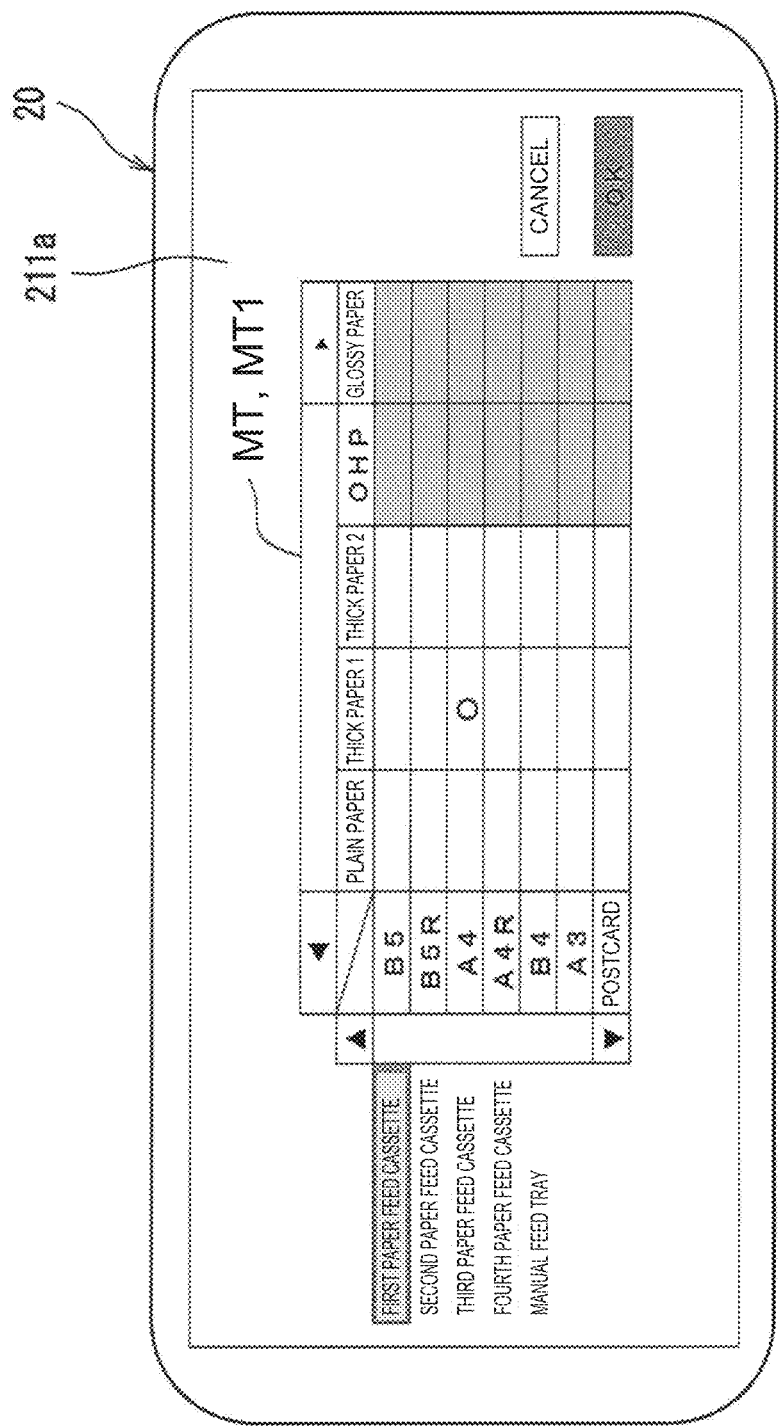

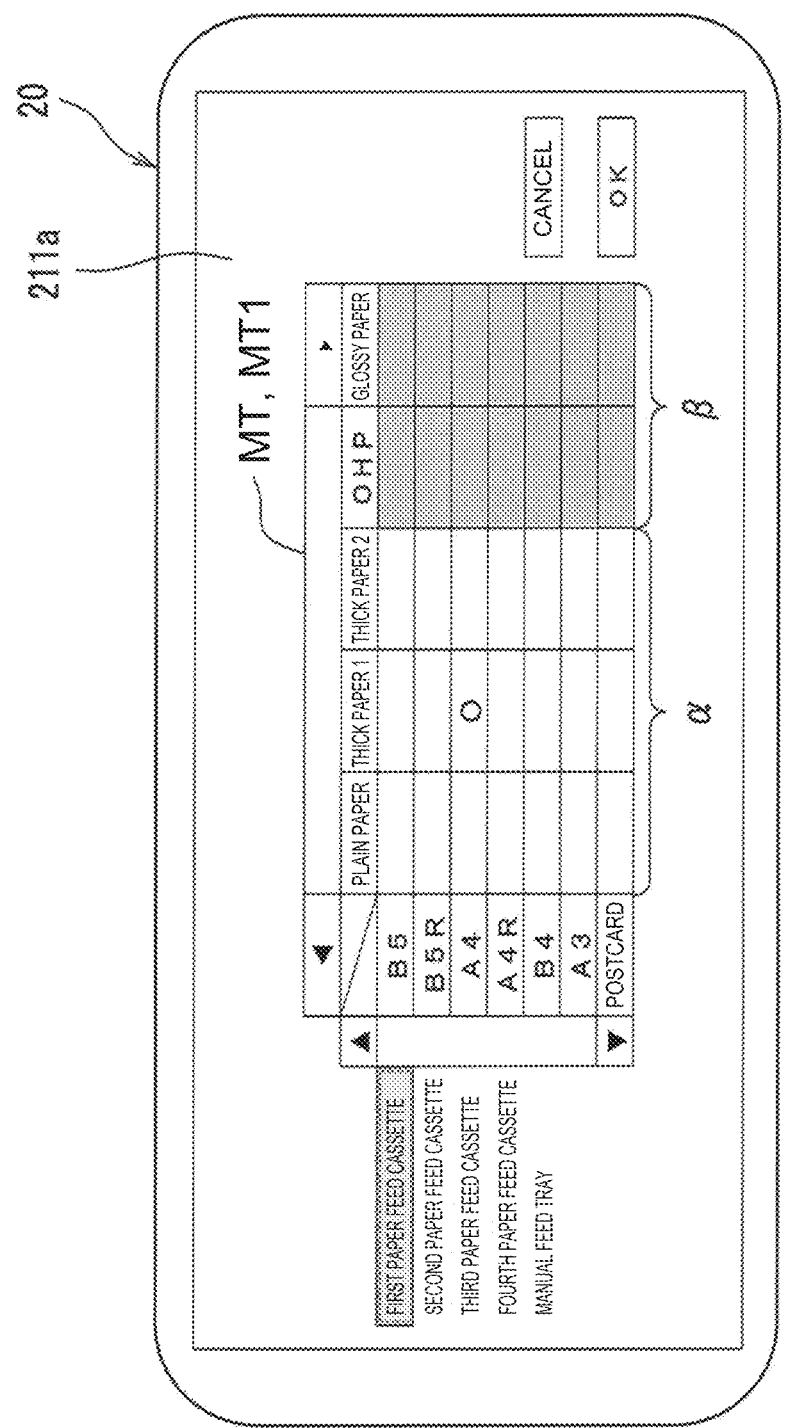

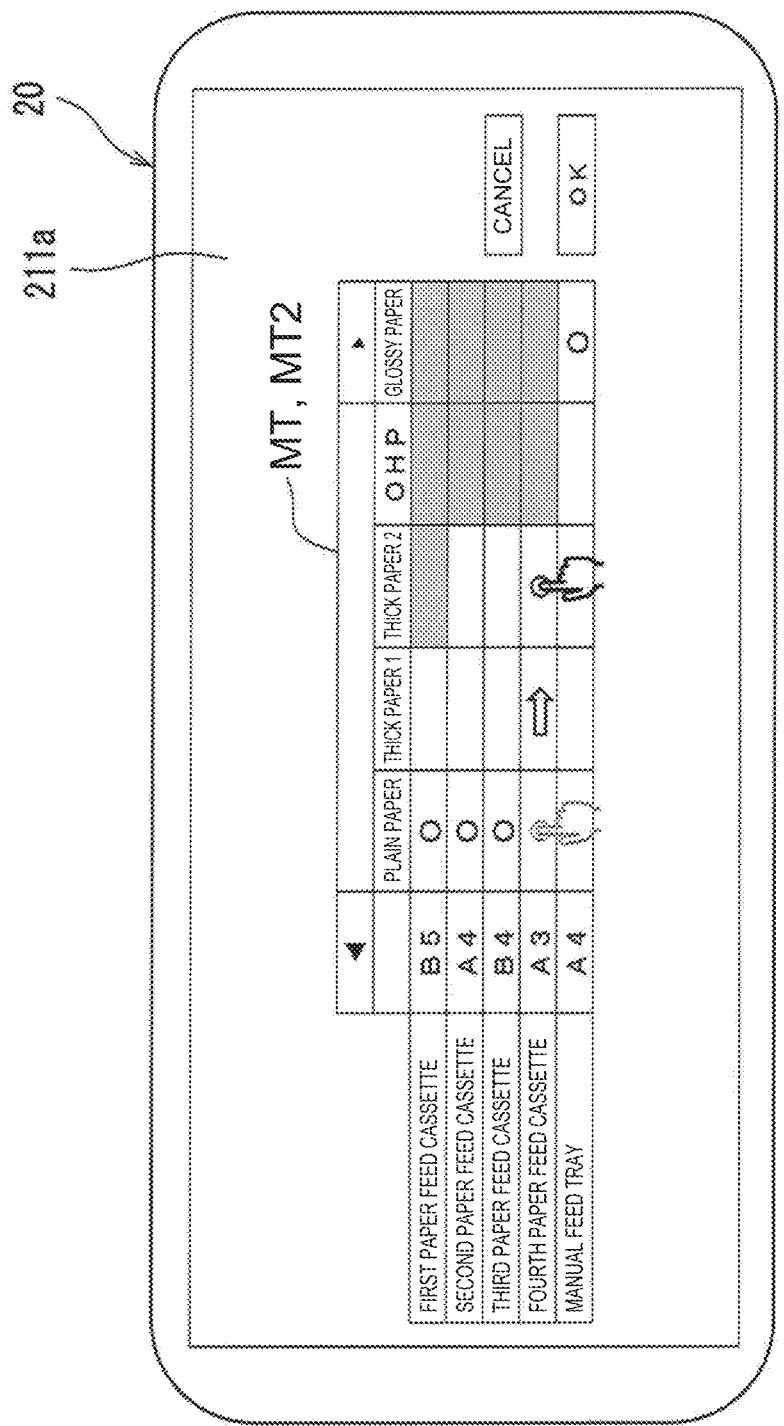

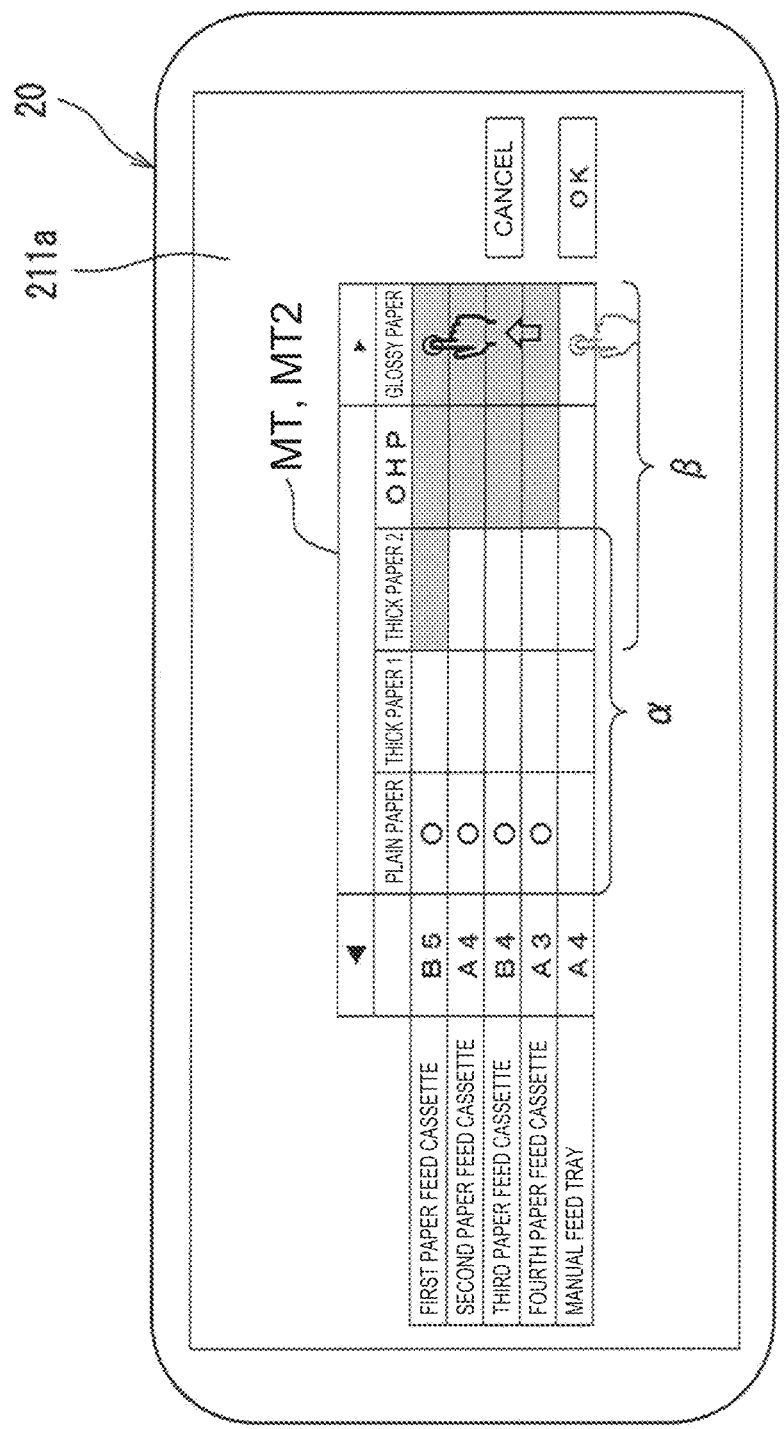

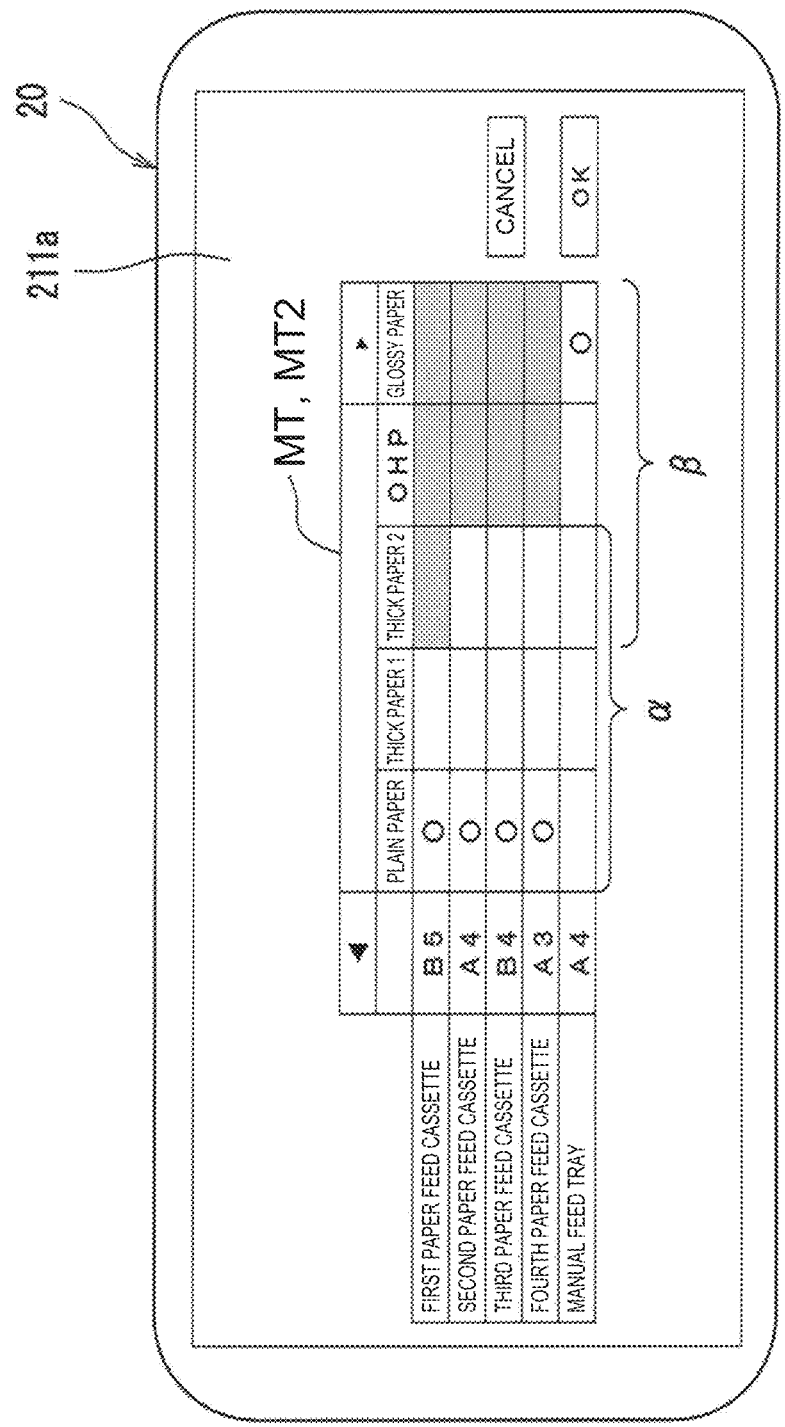

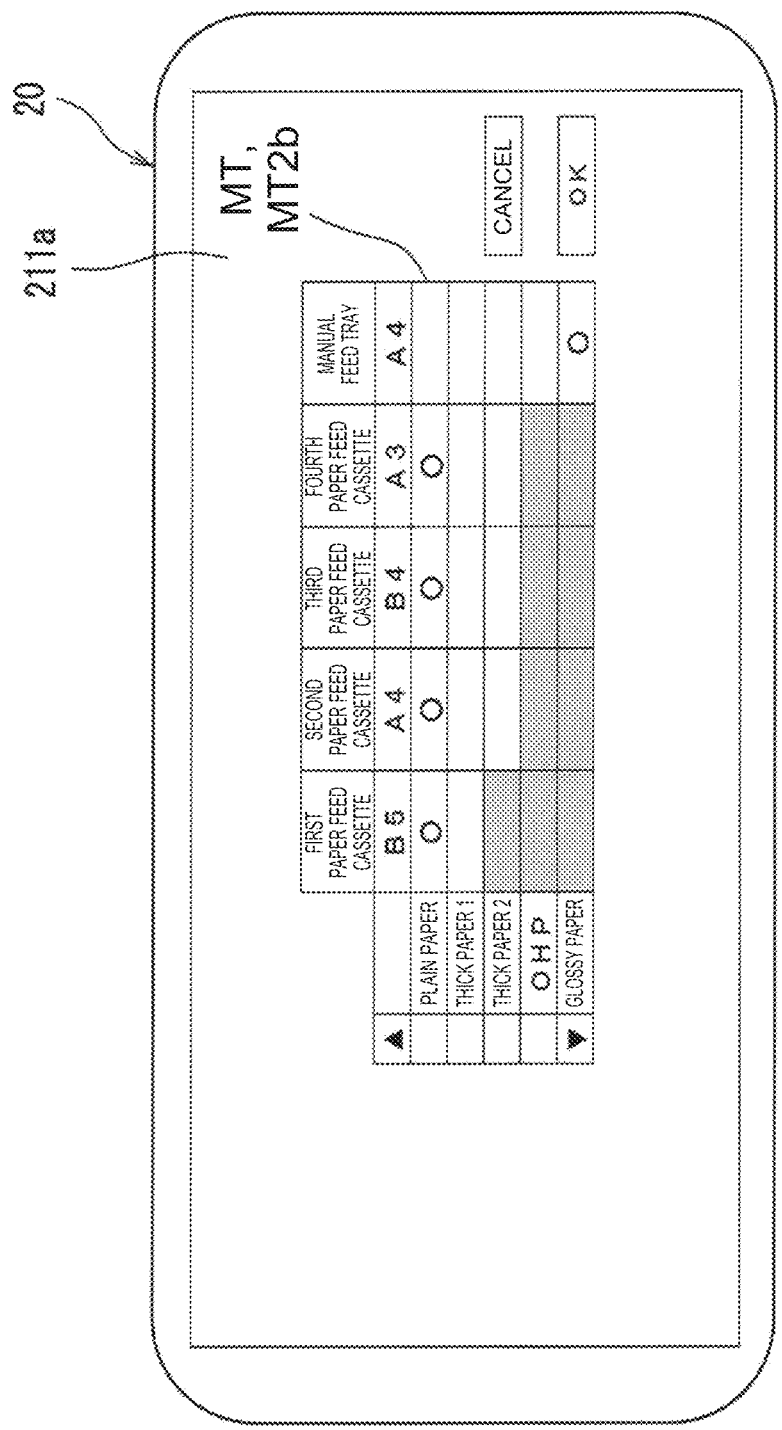

OPERATION ASSISTANCE SYSTEM FOR IMAGE FORMING APPARATUS, OPERATION ASSISTANCE METHOD, AND COMPUTER-READABLE RECORDING MEDIUM RECORDING OPERATION ASSISTANCE PROGRAM

BACKGROUND OF THE INVENTION

Field of the Invention

The present invention relates to an operation assistance system, an operation assistance method, and a computer-readable recording medium recording an operation assistance program for assisting with making operation settings of an image forming apparatus such as a copier, a multi-function peripheral, a printer, and a facsimile machine.

Description of the Background Art

Image forming apparatuses can roughly be classified into: high-segment machines (high-speed machines: expensive high-functional machines) having various functions; and low-segment machines (low-speed machines: low-cost, low-functional machines) with smaller number of functions than the high-segment machines. Of these, the image forming apparatus as the low-segment machine often has a smaller display screen of a display in the image forming apparatus than a display screen of a display in the image forming apparatus as the high-segment machine from a viewpoint of cost reduction. In this case, information that can be displayed on a single screen is limited. In addition, an operation setting is usually made by displaying each setting in a hierarchy. Thus, it is difficult for a user to make the operation setting. Furthermore, various detection functions are limited in the image forming apparatus as the low-segment machine from the viewpoint of the cost reduction. Accordingly, various setting items without detection functions cannot be set automatically, and the user has to set the various setting items without the detection functions on the display screen of the display, which is difficult to operate for setting, in the image forming apparatus. As a result, the operation setting is complicated. Here, as an example of the various detection functions, a detection function such as detection of size of a sheet stored in a sheet storage (a paper feed cassette or a paper feed tray), which stores the sheet such as recording paper, can be exemplified. As the operational settings that are made by the user, the size and a type of the sheet for the sheet storage (the paper feed cassette or the paper feed tray) can be exemplified in regard to the image forming apparatus as the low-segment machine, and the type of the sheet for the sheet storage (the paper feed cassette or the paper feed tray) can be exemplified in regard to the image forming apparatus as the high-segment machine.

In this regard, a technique of assisting with making the operation settings of the image forming apparatus by using a mobile communication terminal has conventionally been known. For example, Japanese Unexamined Patent Application Publication No. 2016-192739 discloses a system that sets sheet attribute information for a sheet storage in a sheet processor by using a mobile terminal.

However, in the system disclosed in Japanese Unexamined Patent Application Publication No. 2016-192739, an operation screen of the mobile communication terminal is merely operated instead of the display screen of the display in the image forming apparatus. Thus, operability of making the operation settings of the image forming apparatus by the user is not improved.

In view of the above, an object of the present invention is to provide an operation assistance system, an operation assistance method, and a computer-readable recording medium recording an operation assistance program for an image forming apparatus, the operation assistance system, the operation assistance method, and the computer-readable recording medium recording the operation assistance program being able to improve operability of making an operation setting of the image forming apparatus by a user.

SUMMARY OF THE INVENTION

In order to solve the above problem, the present invention provides an operation assistance system, an operation assistance method, and a computer-readable recording medium recording an operation assistance program for an image forming apparatus, which will be described below.

(1) Operation Assistance System for Image Forming Apparatus

An operation assistance system for an image forming apparatus according to the present invention is an operation assistance system that assists with making an operation setting of an image forming apparatus by using a mobile communication terminal. The mobile communication terminal wirelessly communicates with the image forming apparatus, and, on an operation screen of the mobile communication terminal, at least two types of setting items among plural types of the setting items for the image forming apparatus are simultaneously set by a single touch operation.

(2) Operation Assistance Method for Image Forming Apparatus

An operation assistance method for an image forming apparatus according to the present invention is an operation assistance method that assists with making an operation setting of an image forming apparatus by using a mobile communication terminal. The operation assistance method includes: causing the mobile communication terminal to wirelessly communicate with the image forming apparatus; and on an operation screen of the mobile communication terminal, simultaneously setting at least two types of setting items among plural types of the setting items for the image forming apparatus by a single touch operation.

(3) Computer-Readable Recording Medium Recording Operation Assistance Program for Image Forming Apparatus A computer-readable recording medium recording an operation assistance program for an image forming apparatus causes a computer to execute each step in the operation assistance method for an image forming apparatus according to the present invention.

According to the present invention, it is possible to improve operability of making the operation setting of the image forming apparatus by a user.

BRIEF DESCRIPTION OF THE DRAWINGS

FIG. 2B is a plan view illustrating an example of a display and an operation device in the image forming apparatus as the low-segment machine.

FIG. 5B is a front view illustrating the transition state where the setting item in the matrix table is set by the touch operation at the time of communicating with the image forming apparatus as the low-segment machine.

FIG. 6B is a front view illustrating the transition state where the setting item in the matrix table is set by the touch operation and the drag operation at the time of communicating with the image forming apparatus as the low-segment machine.

FIG. 6D is a front view illustrating the transition state where the setting item in the matrix table is set by the touch operation and the drag operation at the time of communicating with the image forming apparatus as the low-segment machine.

FIG. 7C is a front view illustrating the transition state where setting of the setting item in the matrix table by the touch operation and the drag operation is disallowed at the time of communicating with the image forming apparatus as the low-segment machine.

FIG. 8C is a front view illustrating the transition state where the setting item in the matrix table is set by the touch operation and the drag operation at the time of communicating with the image forming apparatus as the high-segment machine.

FIG. 9A is a front view illustrating a transition state where setting of the setting item in the matrix table by the touch operation and the drag operation is disallowed at the time of communicating with the image forming apparatus as the high-segment machine.

FIG. 9C is a front view illustrating the transition state where setting of the setting item in the matrix table by the touch operation and the drag operation is disallowed at the time of communicating with the image forming apparatus as the high-segment machine.

FIG. 11B is a front view illustrating another example of the display pattern of the second matrix table at the time of communicating with the image forming apparatus as the high-segment machine.

DESCRIPTION OF THE PREFERRED EMBODIMENTS

Figure 1:
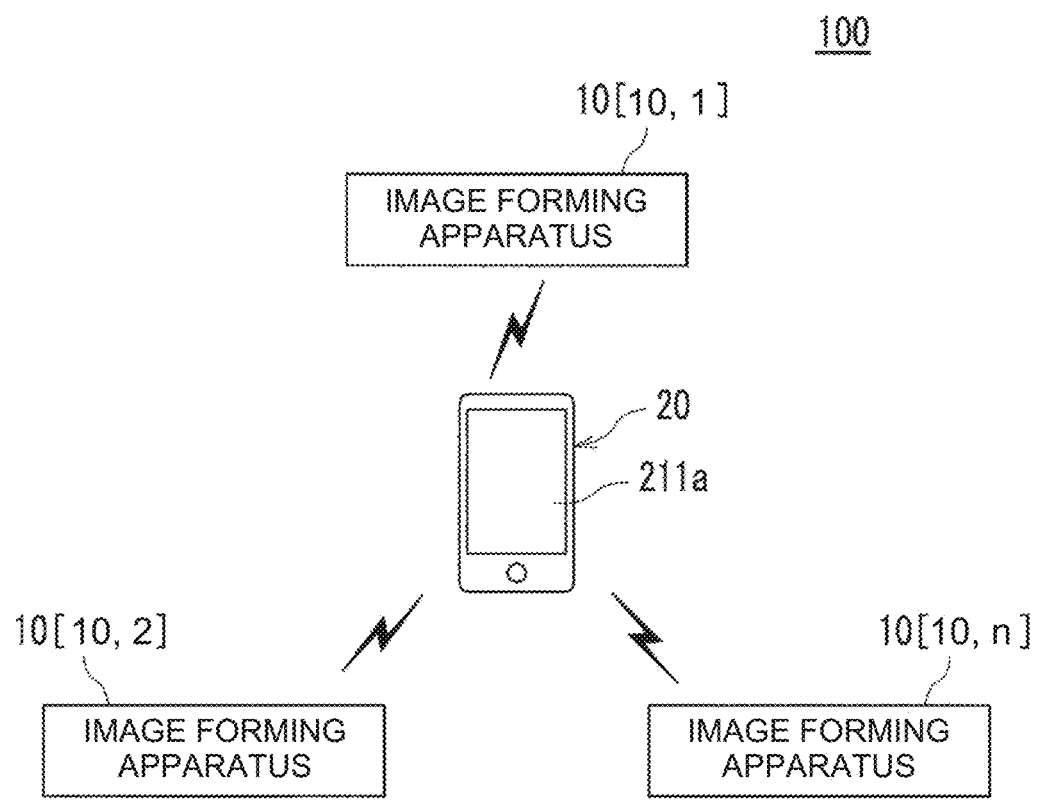
FIG. 1 is a schematic view illustrating an example of an operation assistance system that implements an operation assistance method for an image forming apparatus according to an embodiment of the present invention.

A description will hereinafter be made on an embodiment according to the present invention with reference to the drawings. In the following description, the same components will be denoted by the same reference numerals and symbols. Names and functions thereof are also the same. Thus, a detailed description thereon will not be repeated.

Figure 2A:
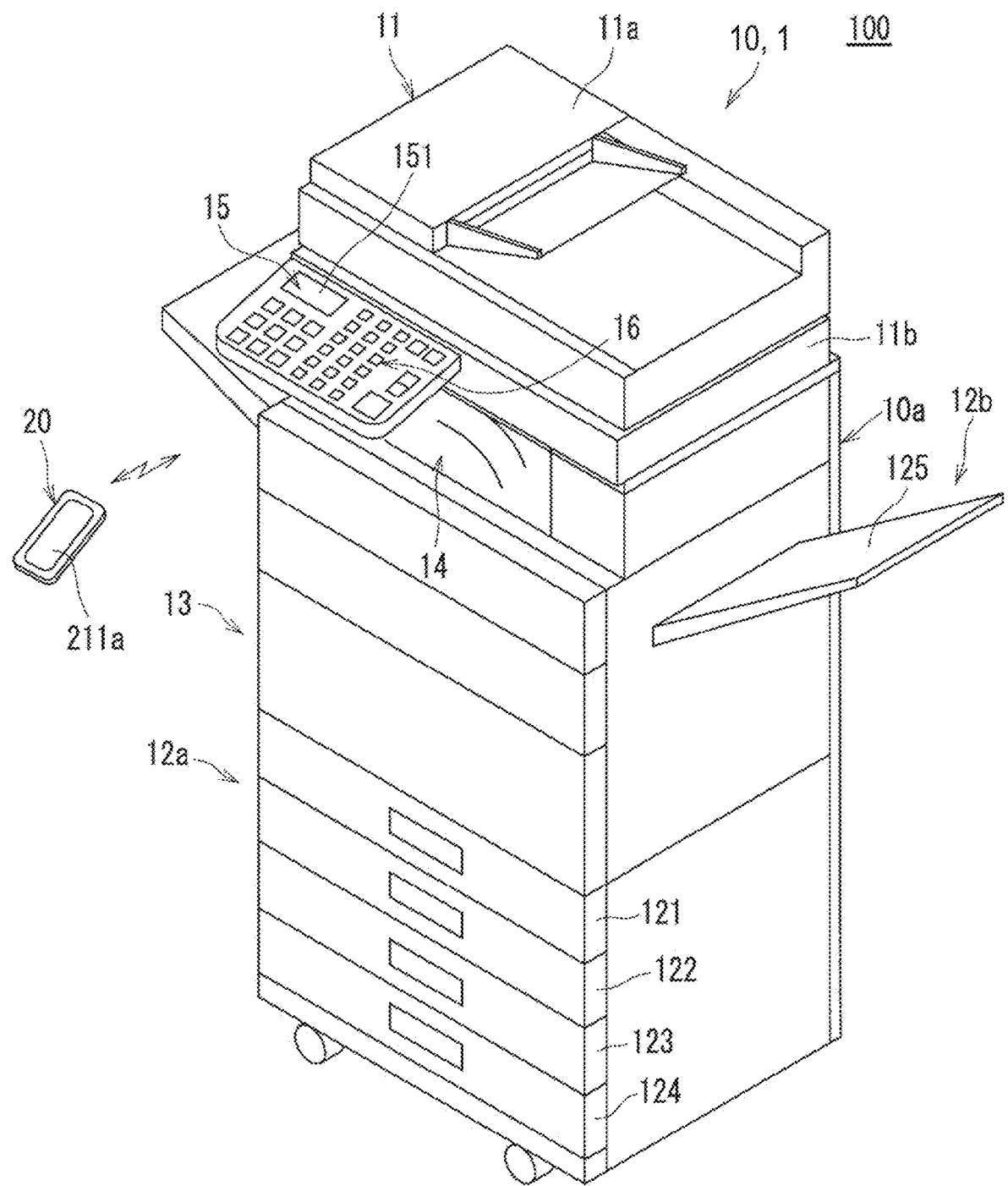
FIG. 2A is a perspective view illustrating an example of an image forming apparatus as a low-segment machine.
Figure 3:
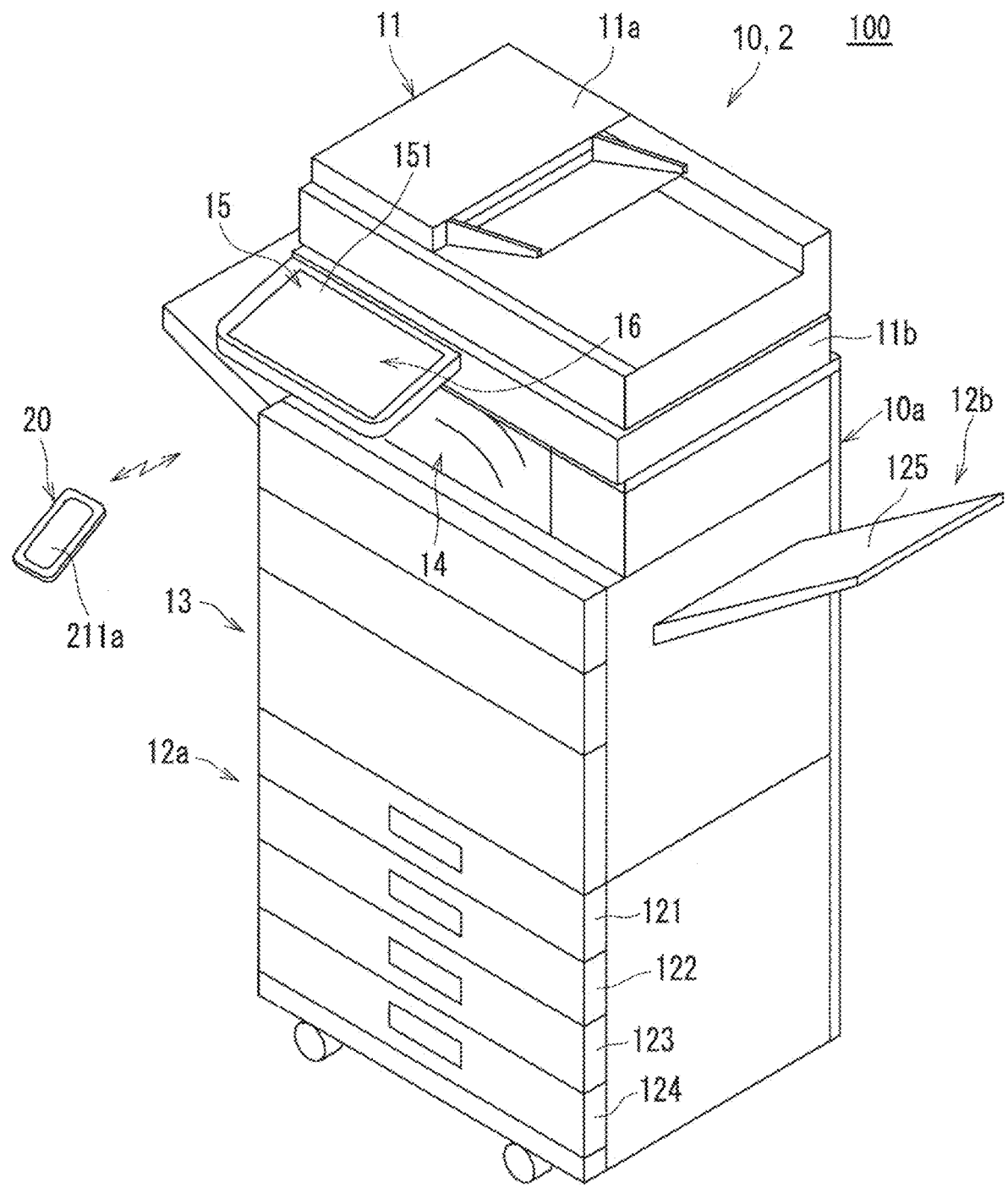
FIG. 3 is a perspective view illustrating an example of an image forming apparatus as a high-segment machine.
Figure 4:
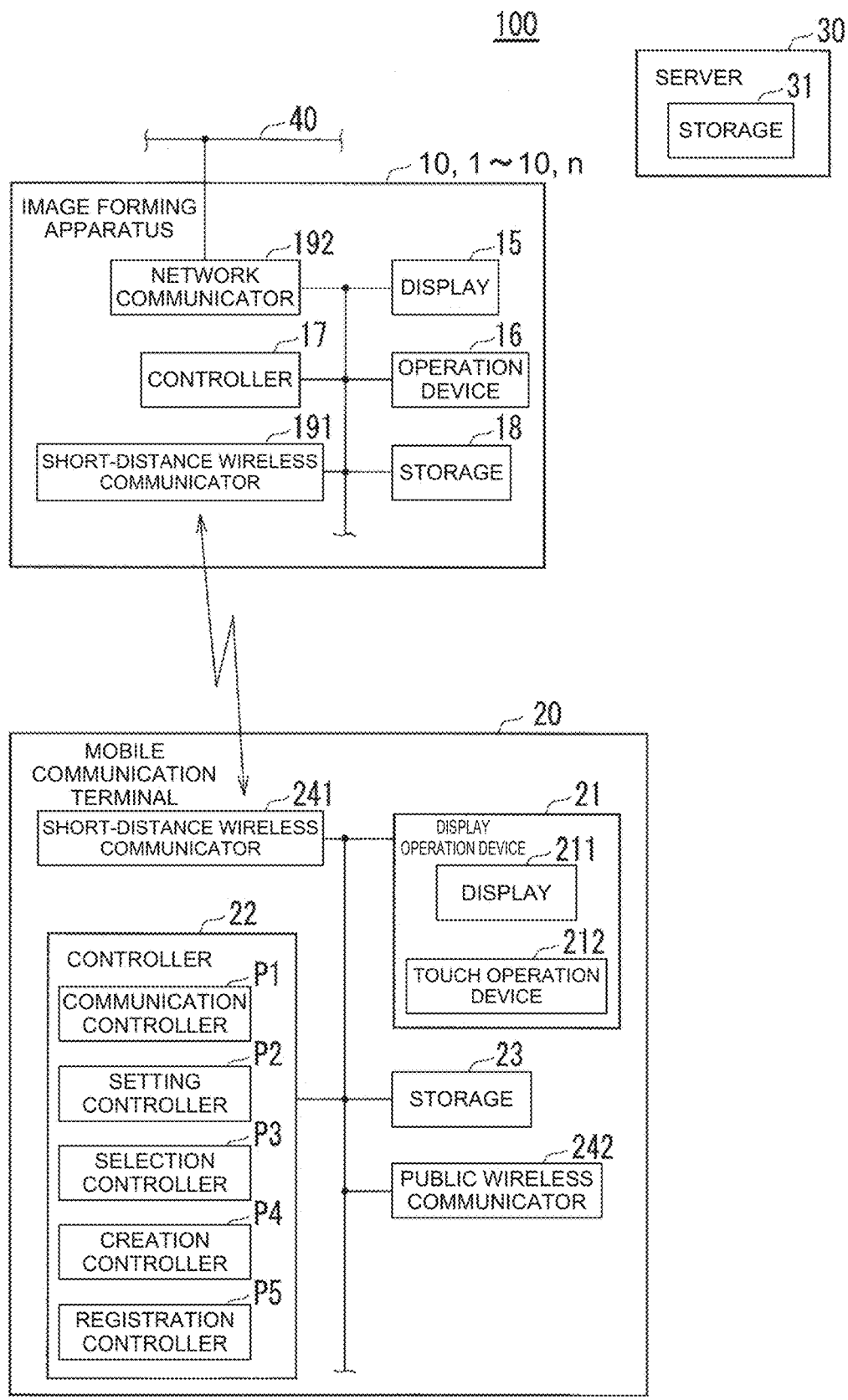
FIG. 4 is a block diagram illustrating an example of a system configuration of the operation assistance system according to this embodiment.

FIG. 1 is a schematic view illustrating an example of an operation assistance system 100 that implements an operation assistance method for an image forming apparatus 10 according to the embodiment of the present invention. FIG. 2A is a perspective view illustrating an example of an image forming apparatus 10(1) as a low-segment machine. FIG. 2B is a plan view illustrating an example of a display 15 and an operation device 16 in the image forming apparatus 10(1) as the low-segment machine. FIG. 3 is a perspective view illustrating an example of an image forming apparatus 10(2) as a high-segment machine. FIG. 4 is a block diagram illustrating an example of a system configuration of the operation assistance system 100 according to this embodiment. FIG. 4 is a block diagram illustrating an example of a system configuration of the operation assistance system 100 illustrated in FIG. 1.

The operation assistance system 100 illustrated in FIG. 1 includes one, two, or more of the image forming apparatuses 10 [10(1) to 10(n) (n is an integer of one or larger)] and one, two, or more (one in this example) mobile communication terminals 20. In this example, the single mobile communication terminal 20 is provided. However, the operation assistance system 100 may include a plurality of the mobile communication terminals 20.

Each of the image forming apparatuses 10(1) to 10(n) includes a digital multifunction peripheral (MFP) that has an image forming function (a printer function), a scanner function, and a copier function (a document copying function). At least one of the image forming apparatuses 10(1) to 10(n) [for example, the image forming apparatuses 10(1), 10(2)] includes: an image reader 11; a sheet storage 12a with one or plural drawers on a main body side; a sheet storage 12b on a manual feed side; an image forming device 13; a sheet discharger 14 (a paper discharger); the display 15; and the operation device 16. In this example, the sheet storage 12a on the main body side includes a first paper feed cassette 121 to a fourth paper feed cassette 124, and the sheet storage 12b on the manual feed side is a manual feed tray 125.

The image reader 11 reads an image of a document and is provided in an upper portion of an image forming apparatus main body 10a. The image reader 11 includes a document conveyor 11a and a document reader 1ib. The image reader 11 conveys the document by the document conveyor 11a and reads the image of the document by the document reader 1ib. Alternatively, the image reader 11 scans and reads the document, which is placed on a document table of the document reader 1ib, by the document reader 1ib. Each of the sheet storages 12a, 12b conveys paper toward the image forming device 13. The image forming device 13 forms (prints) the image on the paper, which has been sent from one of the sheet storages 12a, 12b, on the basis of image data. The sheet discharger 14 discharges the paper, on which the image has been formed by the image forming device 13. The display 15 displays various types of information on a display screen 151 on the basis of display data. The operation device 16 accepts a user's input operation.

In this example, the image forming apparatus 10(1) illustrated in FIG. 2A is classified as the low-segment machine with the smaller number of the various functions than those of the image forming apparatus 10(2) as the high-segment machine. The image forming apparatus 10(1) as the low-segment machine does not have a detection function that corresponds to plural types of setting items (sheet size in this example). In this example, the image forming apparatus 10(2) illustrated in FIG. 3 is classified as the image forming apparatus as the high-segment machine having the various functions. The image forming apparatus 10(2) as the high-segment machine has the detection function that corresponds to at least one type of the setting item (the sheet size). In this example, the at least one type of the detection function is a detection function such as detection of the sheet size stored in each of the sheet storages 12a, 12b.

From a viewpoint of cost reduction, the image forming apparatus 10(1) as the low-segment machine has the smaller display screen 151 of the display 15 than the display screen 151 of the display 15 in the image forming apparatus 10(2) as the high-segment machine (see FIG. 2B). Accordingly, the information that can be displayed on the single screen is limited. In addition, an operation setting is made by displaying each setting in a hierarchy. Thus, it is difficult for the user to make the operation setting. Furthermore, from the viewpoint of the cost reduction, the image forming apparatus 10(1) as the low-segment machine has the limited number of detection functions. Accordingly, the various setting items without the detection function cannot be set automatically, and the user has to set the various setting items without the detection function on the display screen 151 of the display 15, which is difficult for the user to operate for setting, in the image forming apparatus 10(1). As a result, the operation setting is complicated.

In this regard, the operation assistance system 100 according to this embodiment assists with making the operation settings of the image forming apparatuses 10(1) to 10(n) by using the mobile communication terminal 20.

As illustrated in FIG. 4, in the operation assistance system 100 according to this embodiment, each of the image forming apparatuses 10(1) to 10(n) and the mobile communication terminal 20 respectively include short-distance wireless communicators 191, 241, each of which performs short-distance wireless communication, and are thereby mutually communicable. Examples of the short-distance wireless communication are wireless local area network (LAN) communication and wireless personal area network (PAN) communication. An example of the wireless LAN communication is wireless LAN communication with the IEEE 802.11 standard as a representative example of Wi-Fi standards. An example of the wireless PAN communication is wireless PAN communication with the IEEE 802.15 standard as a representative example of Bluetooth® standards. In this example, each of the short-distance wireless communicators 191, 241 is a communication interface that complies with the IEEE 802.11 standard.

The image forming apparatuses 10(1) to 10(n) and the mobile communication terminal 20 communicate with a server 30 via a predetermined communicator such as the Internet. Each of the image forming apparatuses 10(1) to 10(n) and the mobile communication terminal 20 respectively include a network communicator 192 and a public wireless communicator 242. Each of the image forming apparatuses 10(1) to 10(n) and the mobile communication terminal 20 are mutually communicable with the server 30 via the network communicator 192 and the public wireless communicator 242, respectively. Here, the operation assistance system 100 may include the server 30.

Examples of the communicator through which the image forming apparatuses 10(1) to 10(n) and the server 30 communicate with each other are a communicator via the Internet by a local network 40 (LAN) and a communicator via the Internet by the wireless LAN communication with the IEEE 802.11 standard. Examples of the communicator through which the mobile communication terminal 20 and the server 30 communicate with each other are a communicator via the Internet with a mobile phone communication standard and the communicator via the Internet by the wireless LAN communication with the IEEE 802.11 standard.

Image Forming Apparatus

Each of the image forming apparatuses 10(1) to 10(n) further includes a controller 17 and a storage 18. The display 15, the operation device 16, the storage 18, the short-distance wireless communicator 191, and the network communicator 192 are electrically connected to the controller 17.

Controller

The controller 17 is constructed of a computer including a central processing unit (CPU), and governs control of respective one of the entire image forming apparatuses 10(1) to 10(n). The controller 17 stores the plural types of the setting items in the storage 18. Here, representative examples of the plural types of the setting items are sizes (for example, B5, B5R, A4, A4R, B4, A3, and postcard) and types (for example, plain paper, thick paper, an OHP film, glossy paper, and the like) of sheets such as recording paper for each of the sheet storages 12a, 12b. Here, the plural types of the setting items can be set when the user performs the input operation to the operation device 16. However, as will be described below, the plural types of the setting items can also be set by using the mobile communication terminal 20. Meanwhile, in the image forming apparatus 10 (2) as the high-segment machine, of the plural types of the setting items, the setting item that corresponds to the detection function (for example, the sheet size detected by size detection) is automatically detected by the detection function.

Storage

Under instructions of the controller 17, the storage 18 is subjected to writing control in which information is written and reading control in which the information is read. In this example, the setting items are written in and read from the storage 18. In addition, the storage 18 stores, in advance, attribute information of respective one of the image forming apparatuses 10(1) to 10(n). Examples of the attribute information of each of the image forming apparatuses 10 (1) to 10 (n) are: a segment of respective one of the image forming apparatuses 10(1) to 10(n) (whether the high-segment machine or the low-segment machine); identification information (for example, a drawer number) of the sheet storage 12a (the paper feed cassette); the printable sheet sizes by the image forming device 13 (for example, postcard, A5, B5, B5R, A4, A4R, B4, A3, letter, envelope, and the like); and the printable sheet types by the image forming device 13 (for example, thin paper, plain paper, recycled paper, thick paper, glossy paper, embossed paper, label, OHP, index, and the like). Meanwhile, in the image forming apparatus 10(2) as the high-segment machine, the attribute information further includes: the setting item that corresponds to the detection function (for example, the sheet size detected by the size detection); and the setting item (for example, the sheet type) that is set by the user for the image forming apparatus main body 10a through the operation device 16.

Mobile Communication Terminal

The mobile communication terminal 20 is a multifunctional mobile communication terminal (for example, a smartphone or a tablet-type terminal), and further includes a display operation device 21, a controller 22 (an example of a computer), and a storage 23. The display operation device 21, the storage 23, the short-distance wireless communicator 241, and the public wireless communicator 242 are electrically connected to the controller 22.

The display operation device 21 includes a display 211 (a display panel) and a touch operation device 212 (a touch panel). The display operation device 21 accepts the user's touch operation by the touch operation device 212 and displays the various types of the setting items on an operation screen 211a on the basis of display data. Here, the touch operation is a concept that includes a drag operation. The drag operation is an operation in which a finger moves while maintaining the touch operation on the operation screen 211a of the mobile communication terminal 20.

Controller

The controller 22 is constructed of a computer including a central processing unit (CPU). The controller 22 is configured to set the various types of the setting items for the image forming apparatuses 10(1) to 10(n) by executing an operation assistance program, which is stored (installed) in the storage 23 in advance. The controller 22 executes various types of processing by loading and executing the operation assistance program, which is stored in read only memory (ROM) of the storage 23 in advance, on random access memory (RAM) of the storage 23. The operation assistance program assists with making the operation settings of the image forming apparatuses 10(1) to 10(2) by using the mobile communication terminal 20.

The controller 22 also executes data exchange during communication, various types of input/output control, and calculation processing control. When accepting the touch operation by the user's finger on the touch operation device 212 in the display 211, the controller 22 reads an operation position by the touch operation device 212, recognizes a part that is displayed at the operation position on the display 211, and executes the processing.

Storage

The storage 23 has non-volatile memory such as the ROM and a volatile memory such as the RAM. Under instructions of the controller 22, the storage 23 is subjected to writing control in which information is written and reading control in which the information is read. In this example, a matrix table, which will be described below, is written in and read from the storage 23.

In addition, the operation assistance program is stored (installed) in advance in the storage 23. In this example, the operation assistance program is a program that is referred to as a so-called application and is used in the multifunctional mobile communication terminal such as the smartphone, and is either installed in advance or downloaded and installed from a program server, which is not illustrated, via the communicator such as the Internet.

The short-distance wireless communicator 241 is communicable by the same communication protocol as the short-distance wireless communicator 191 in each of the image forming apparatuses 10(1) to 10(n).

Software Configuration of Mobile Communication Terminal

Next, a description will hereinafter be made on a software configuration of the operation assistance program that is executed by the mobile communication terminal 20.

The controller 22 functions as a device that includes a communication controller P1, a setting controller P2, a selection controller P3, a creation controller P4, and a registration controller P5. More specifically, the operation assistance program causes the controller 22 to execute steps including a communication control step corresponding to the communication controller P1, a setting control step corresponding to the setting controller P2, a selection control step corresponding to the selection controller P3, a creation control step corresponding to the creation controller P4, and a registration control step corresponding to the registration controller P5.

FIG. 5A to FIG. 5E are front views each illustrating a transition state where the setting item in a matrix table MT (a first matrix table MT1) that is displayed on the operation screen 211a of the mobile communication terminal 20 is set by the touch operation at the time of communicating with the image forming apparatus 10(1) as the low-segment machine. FIG. 6A to FIG. 6D are front views each illustrating a transition state where the setting item in the matrix table MT (MT1) that is displayed on the operation screen 211a of the mobile communication terminal 20 is set by the touch operation and the drag operation at the time of communicating with the image forming apparatus 10(1) as the low-segment machine. FIG. 7A to FIG. 7C are front views each illustrating a transition state where setting of the setting item in the matrix table MT (MT1) that is displayed on the operation screen 211a of the mobile communication terminal 20 by the touch operation and the drag operation is disallowed at the time of communicating with the image forming apparatus 10(1) as the low-segment machine.

FIG. 8A to FIG. 8E are front views each illustrating a transition state where the setting item in the matrix table MT (a second matrix table MT2) that is displayed on the operation screen 211a of the mobile communication terminal 20 is set by the touch operation and the drag operation at the time of communicating with the image forming apparatus 10(2) as the high-segment machine. FIG. 9A to FIG. 9C are front views each illustrating a transition state where setting of the setting item in the matrix table MT (MT2) that is displayed on the operation screen 211a of the mobile communication terminal 20 by the touch operation and the drag operation is disallowed at the time of communicating with the image forming apparatus 10(2) as the high-segment machine.

By the way, in the conventional image forming apparatus as the low-segment machine, in particular, the image forming apparatus that has the smaller display screen than the display screen of the image forming apparatus as the high-segment machine, for example, in the case where only one type of the setting item can be displayed on the display screen and the operation settings are to be made for the plural types of the setting items, each of the operation settings is hierarchical, which complicates each of the operation settings. This degrades operability of making the operation setting of the image forming apparatus by the user.

In this regard, in this embodiment, in the communication control step, the mobile communication terminal 20 wirelessly communicates with each of the image forming apparatuses 10(1) to 10(n). In the setting control step, at least two types of the setting items (for example, the sheet sizes and the sheet types for the sheet storages 12a, 12b) among the plural types of the setting items for respective one of the image forming apparatuses 10(1) to 10(n) are simultaneously set by the single touch operation on the operation screen 211a of the mobile communication terminal 20.

In detail, in the setting control step, the matrix table MT (the first matrix table MT1 and the second matrix table MT2) with cells is displayed on the operation screen 211a of the mobile communication terminal 20. In the matrix table MT (the first matrix table MT1 and the second matrix table MT2) with cells, the two types of the setting items (the sheet sizes and the sheet types for the sheet storages 12a, 12b in this example) are sorted into rows and columns. Then, by accepting the touch operation of the cell where the row and the column intersect each other, the two types of the setting items (the sheet size and the sheet for each of the sheet storages 12a, 12b in this example) are simultaneously set.

A format of the matrix table MT (MT1, MT2) is set in advance as a preset value (a default value) in the storage 23. Here, shapes of the formats of the first matrix table MT1 and the second matrix table MT2 are similar to each other. In this way, it is possible to place each of the setting items at the same position or the substantially same position in both of the first matrix table MT1 and the second matrix table MT2. This allows the user to make the operation setting without feeling any sense of discomfort (without being confused about the setting position).

The controller 22 reads the format of the matrix table MT (MT1, MT2) from the storage 23 and displays the matrix table MT (MT1, MT2) on the operation screen 211a. The controller 22 also reads the attribute information of respective one of the image forming apparatuses 10(1) to 10(n) from the storage 23, and displays the attribute information in the format of the matrix table MT (MT1, MT2) on the operation screen 211a (see FIG. 5A). Examples of the attribute information are the segment, the identification information of the sheet storage 12a (the first paper feed cassette 121 to the fourth paper feed cassette 124 in this example), the printable sheet sizes by the image forming device 13 (B5, B5R, A4, A4R, B4, A3, and postcard in this example), the printable sheet types by the image forming device 13 (plain paper, thick paper, OHP, and glossy paper in this example). Meanwhile, in the case where the image forming apparatus 10 is the image forming apparatus 10(2) as the high-segment machine, the attribute information further includes: the setting item that corresponds to the detection function (in this example, the sheet size detected by the size detection); and the setting item (in this example, the sheet type) that is set by the user for the image forming apparatus main body 10a through the operation device 16.

More specifically, the rows in the matrix table MT (MT1, MT2) include the sheet sizes (B5, B5R, A4, A4R, B4, A3, and postcard) for the first paper feed cassette 121 to the fourth paper feed cassette 124 and the manual feed tray 125, and the columns in the matrix table MT include the sheet types (plain paper, thick paper 1, thick paper 2, OHP, and glossy paper).

Here, the image forming apparatus 10(1) as the low-segment machine does not have the predetermined detection function (for example, the detection function of the sheet size). Thus, in the case where the mobile communication terminal 20 communicates with the image forming apparatus 10(1) as the low-segment machine, setting values in the first matrix table MT1 are initially displayed null (See FIG. 5B). In this case, the controller 22 accepts the selection operations for the sheet storages 12a, 12b (the first paper feed cassette 121 to the fourth paper feed cassette 124 and the manual feed tray 125) by the user one by one (see FIG. 5A and FIG. 5B), and makes the operation setting of the setting item (the sheet type), which corresponds to the non-existent detection function, for accepted one of the first paper feed cassette 121 to the fourth paper feed cassette 124 or the manual feed tray by the user's touch operation and drag operation (FIG. 5C to FIG. 7C).

Meanwhile, in the case where the mobile communication terminal 20 communicates with the image forming apparatus 10(2) as the high-segment machine, the image forming apparatus 10(2) as the high-segment machine has the detection function (for example, the detection function of the sheet size). According, the controller 22 receives, from the image forming apparatus 10(2), setting values (the sheet sizes for the sheet storages 12a, 12b) corresponding to the detection function and setting values (the sheet types) set by the user through the operation device 16. The setting values in the second matrix table MT2 are the setting values (the sheet sizes for the sheet storages 12a, 12b) that correspond to the detection function and received from the image forming apparatus 10(2). The controller 22 displays the setting values, which correspond to the detection function and are received from the image forming apparatus 10(2), in the format of the second matrix table MT2 on the operation screen 211a. In this case, the user does not have to select the sheet storages 12a, 12b (the first paper feed cassette 121 to the fourth paper feed cassette 124 and the manual feed tray 125) one by one. Accordingly, the controller 22 does not make the selection operations for the sheet storages 12a, 12b (the first paper feed cassette 121 to the fourth paper feed cassette 124 and the manual feed tray 125), and displays setting statuses (the sheet sizes) of the first paper feed cassette 121 to the fourth paper feed cassette 124 and the manual feed tray 125 (see FIG. 8A). The controller 22 also displays the setting values (the sheet types for the sheet storages 12a, 12b), which are set by the user and received from the image forming apparatus 10(2), in the format of the second matrix table MT2 on the operation screen 211a (see FIG. 8B). The controller 22 makes the operation setting of the setting item (the sheet type) for each of the sheet storages 12a, 12b (the first paper feed cassette 121 to the fourth paper feed cassette 124 and the manual feed tray 125) by the user's touch operation and drag operation (FIG. 8C to FIG. 9C).

Next, a description will hereinafter be made on a procedure for simultaneously setting the two setting items (the sheet sizes and the sheet types for the sheet storages 12a, 12b) by the user's touch operation and drag operation.

Regarding First Matrix Table

Figure 5A:
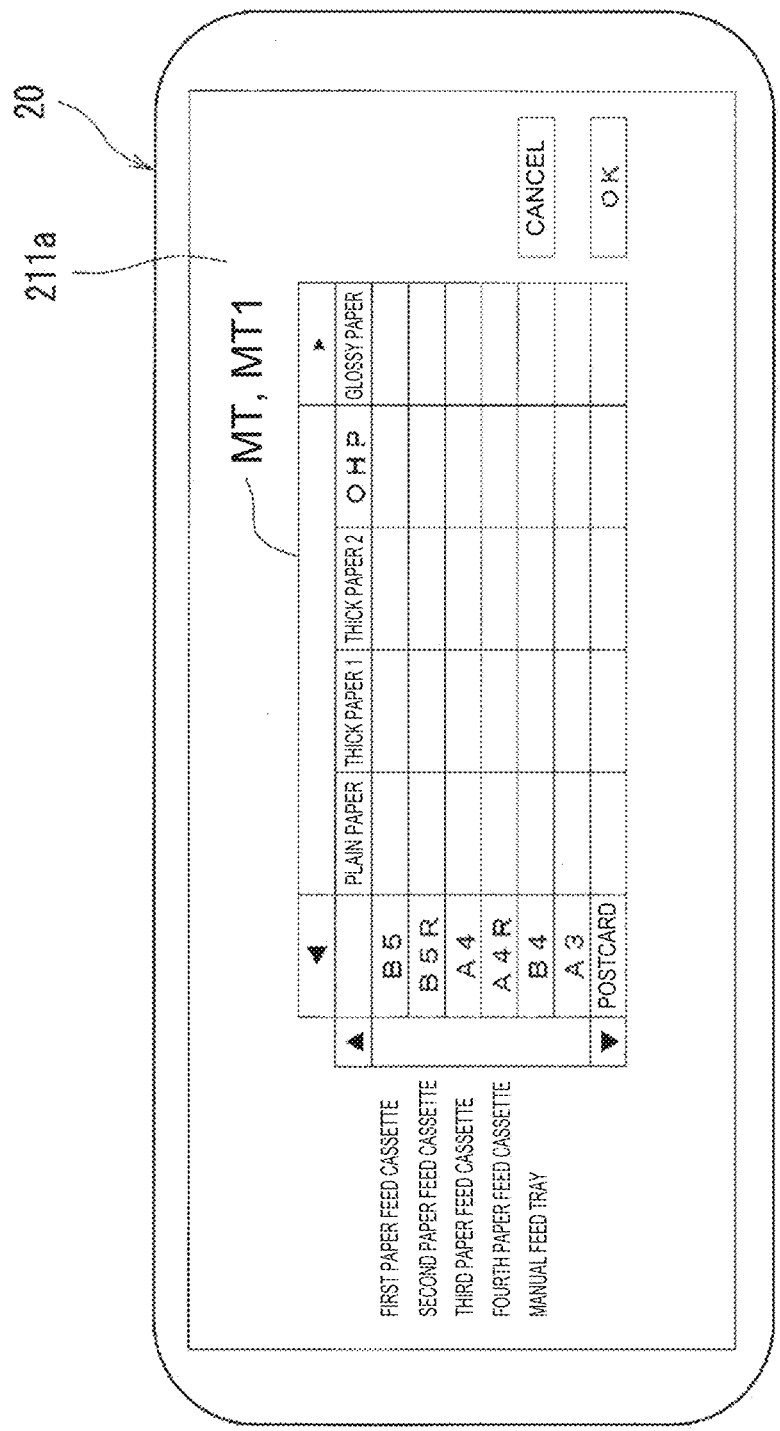
FIG. 5A is a front view illustrating a transition state where a setting item in a matrix table is set by a touch operation at the time of communicating with the image forming apparatus as the low-segment machine.

As illustrated in FIG. 5A to FIG. 5E, in the first matrix table MT1, in a state where none of the first paper feed cassette 121 to the fourth paper feed cassette 124 and the manual feed tray 125 is selected (see FIG. 5A), the user first performs the touch operation for one (the first paper feed cassette 121 in this example) of the first paper feed cassette 121 to the fourth paper feed cassette 124 and the manual feed tray 125 (see FIG. 5B). At this time, the initial setting values are displayed null. However, the sheet sizes and the sheet types for the sheet storages 12a, 12b may be stored as preset values (default values) in the storage 23 in advance. In this case, the initial setting value of the preset value (for example, the size: A4, the type: plain paper for the first paper feed cassette 121) is displayed in the format of the first matrix table MT1.

Figure 5C:
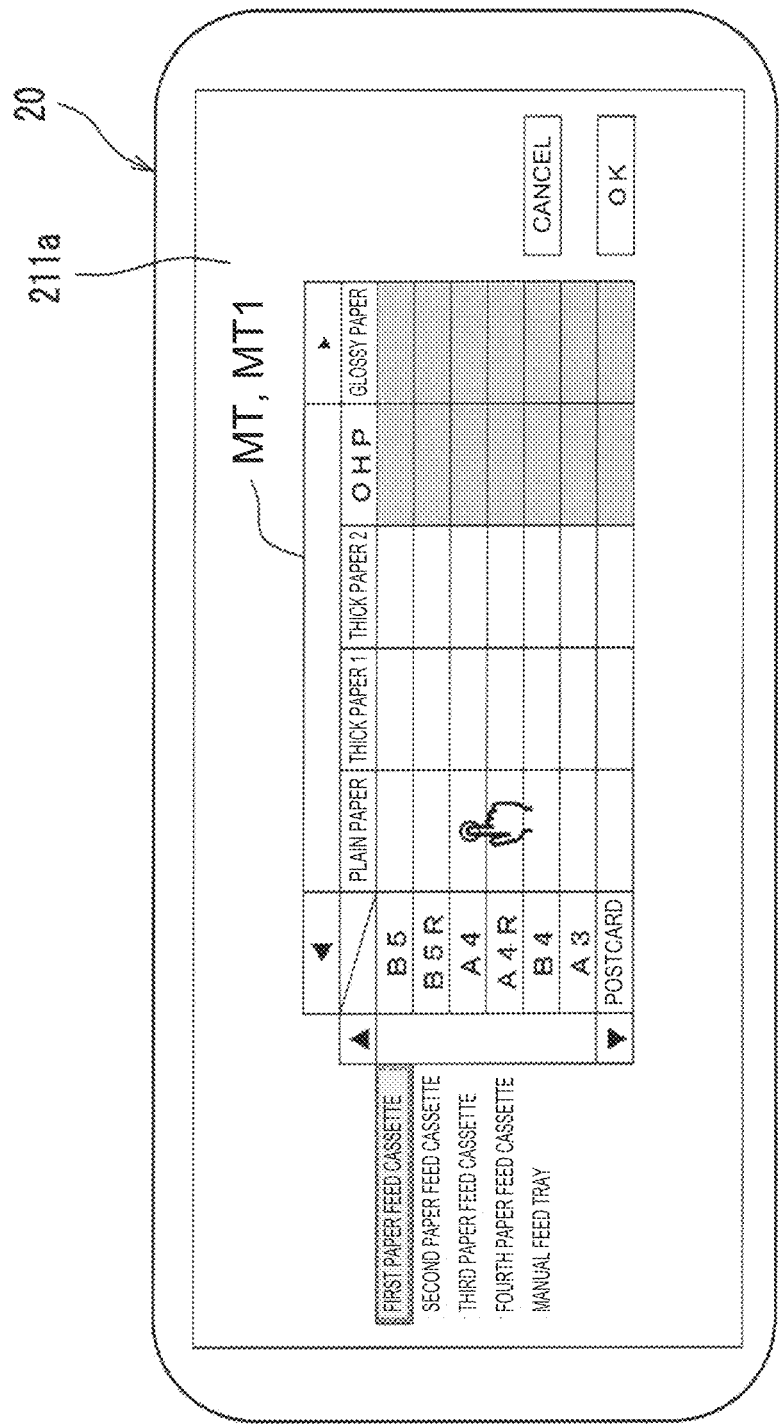
FIG. 5C is a front view illustrating the transition state where the setting item in the matrix table is set by the touch operation at the time of communicating with the image forming apparatus as the low-segment machine.
Figure 5D:
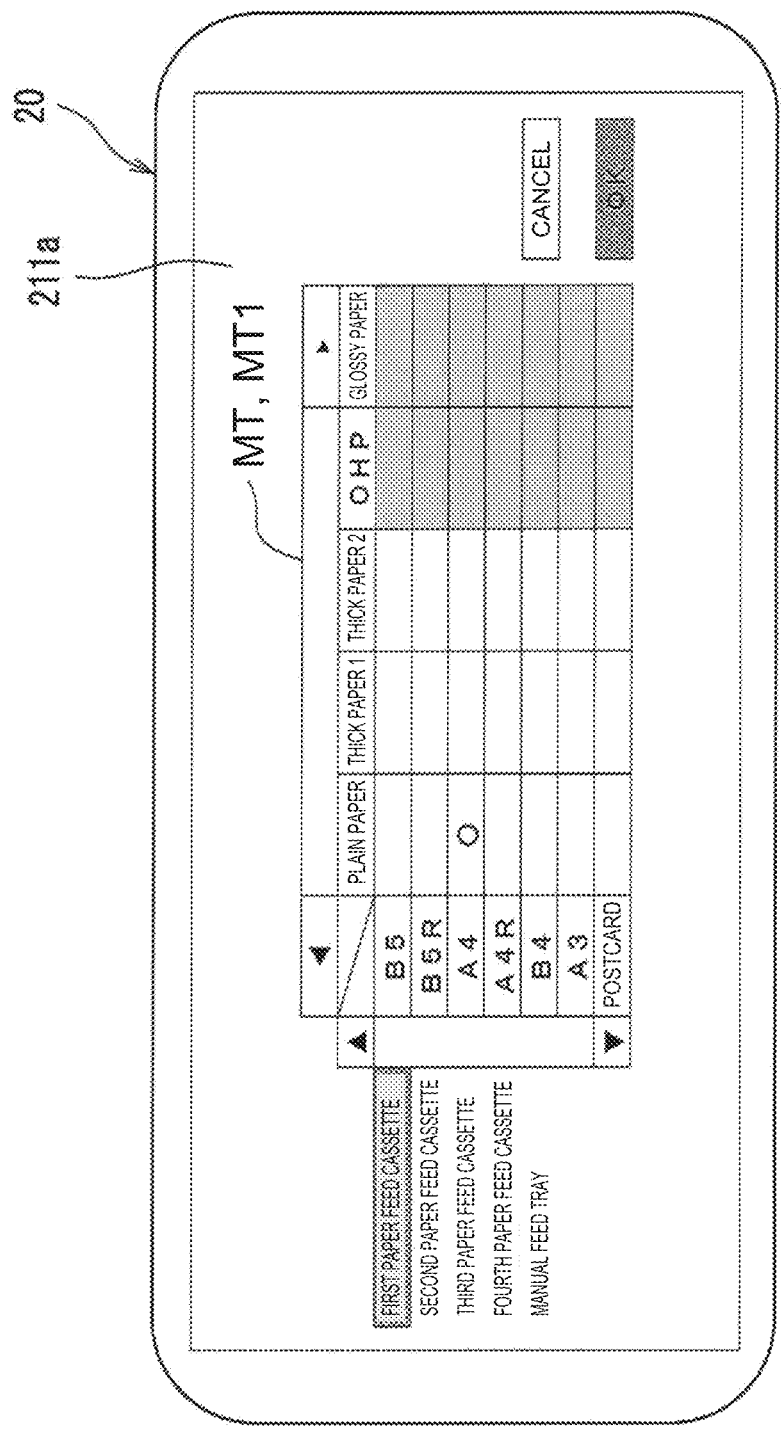
FIG. 5D is a front view illustrating the transition state where the setting item in the matrix table is set by the touch operation at the time of communicating with the image forming apparatus as the low-segment machine.

Next, when the user performs the touch operation to the cell, where the row and the column corresponding to the desired sheet size and the desired sheet type intersect each other, an index (a symbol) (a circle in this example) is displayed in the cell touched by the user (see FIG. 5C). At this time, the user can also move the index (the circle) to a setting position of another cell by performing the touch operation of the another cell or by performing the drag operation of the index (the circle). Next, when the user touches and operates an "OK" button (see FIG. 5D), the set sheet size and the set sheet type (A4 and plain paper for the first paper feed cassette 121 in this example) are stored in the storage 23.

Figure 5E:
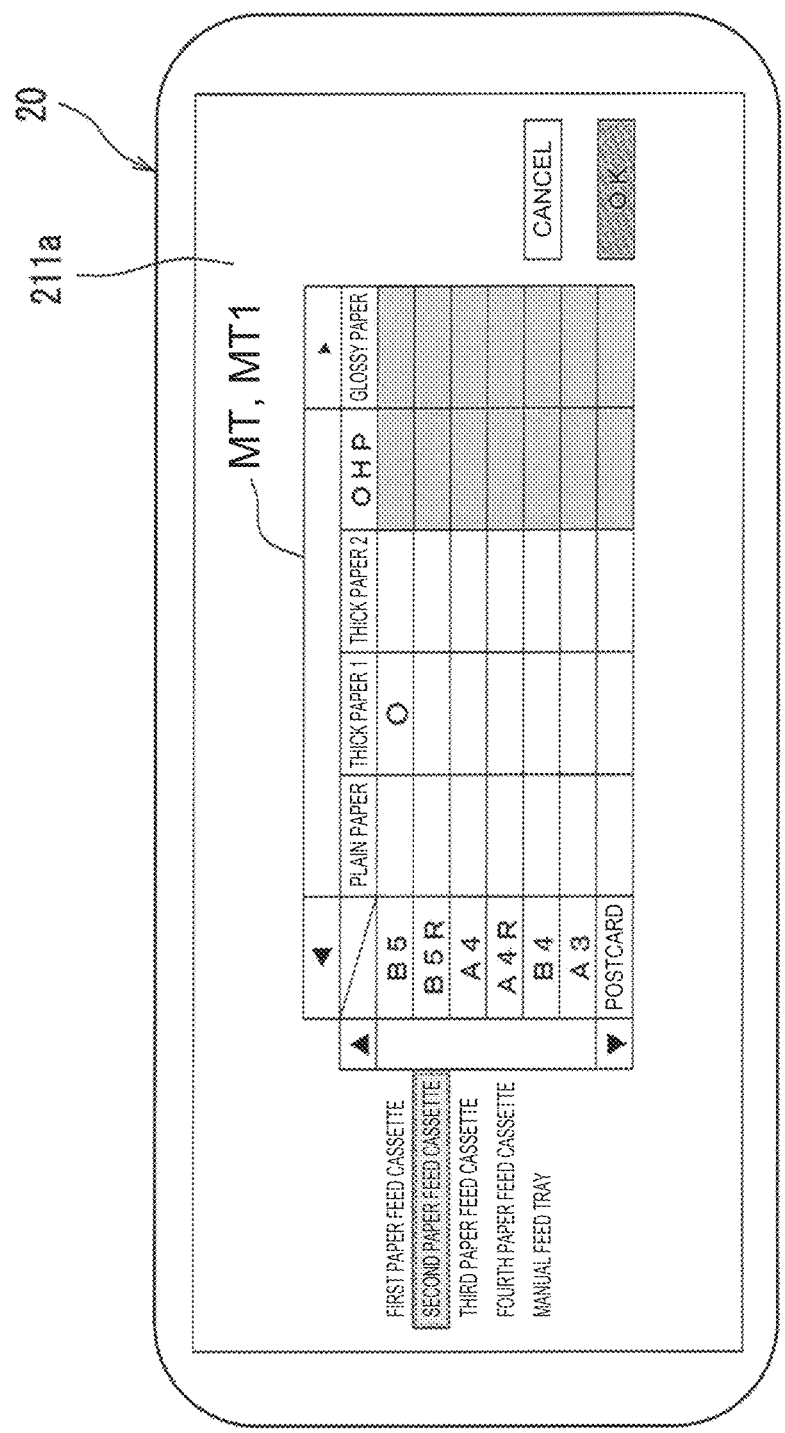
FIG. 5E is a front view illustrating the transition state where the setting item in the matrix table is set by the touch operation at the time of communicating with the image forming apparatus as the low-segment machine.

Similarly, the user makes the similar operation settings for another (the second paper feed cassette 122) of the sheet storages 12a, 12b (the first paper feed cassette 121 to the fourth paper feed cassette 124 and the manual feed tray 125) (see FIG. 5E). In this way, the set sheet size and type (B5 and thick paper 1 for the second paper feed cassette 122 in this example) are stored in the storage 23.

Figure 6A:
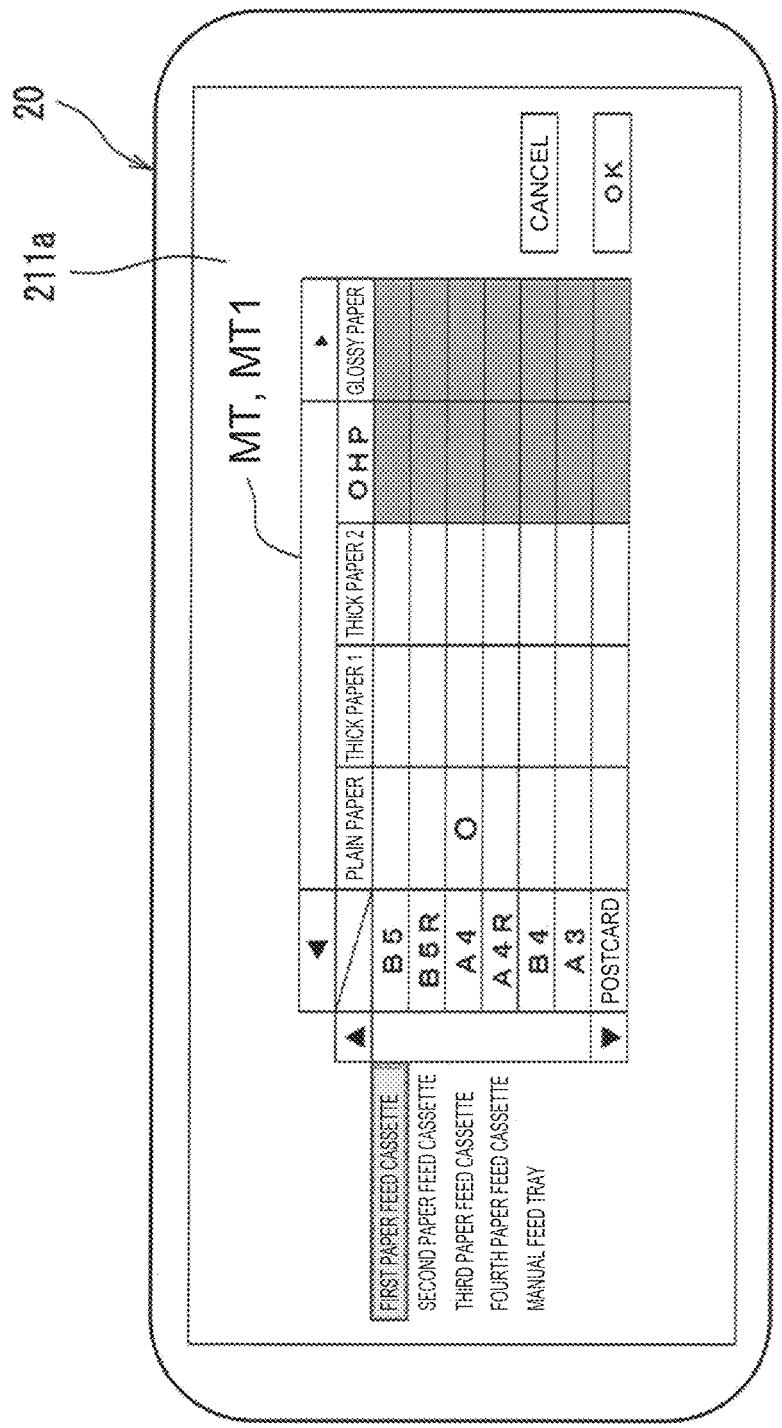
FIG. 6A is a front view illustrating a transition state where the setting item in the matrix table is set by the touch operation and a drag operation at the time of communicating with the image forming apparatus as the low-segment machine.
Figure 6C:
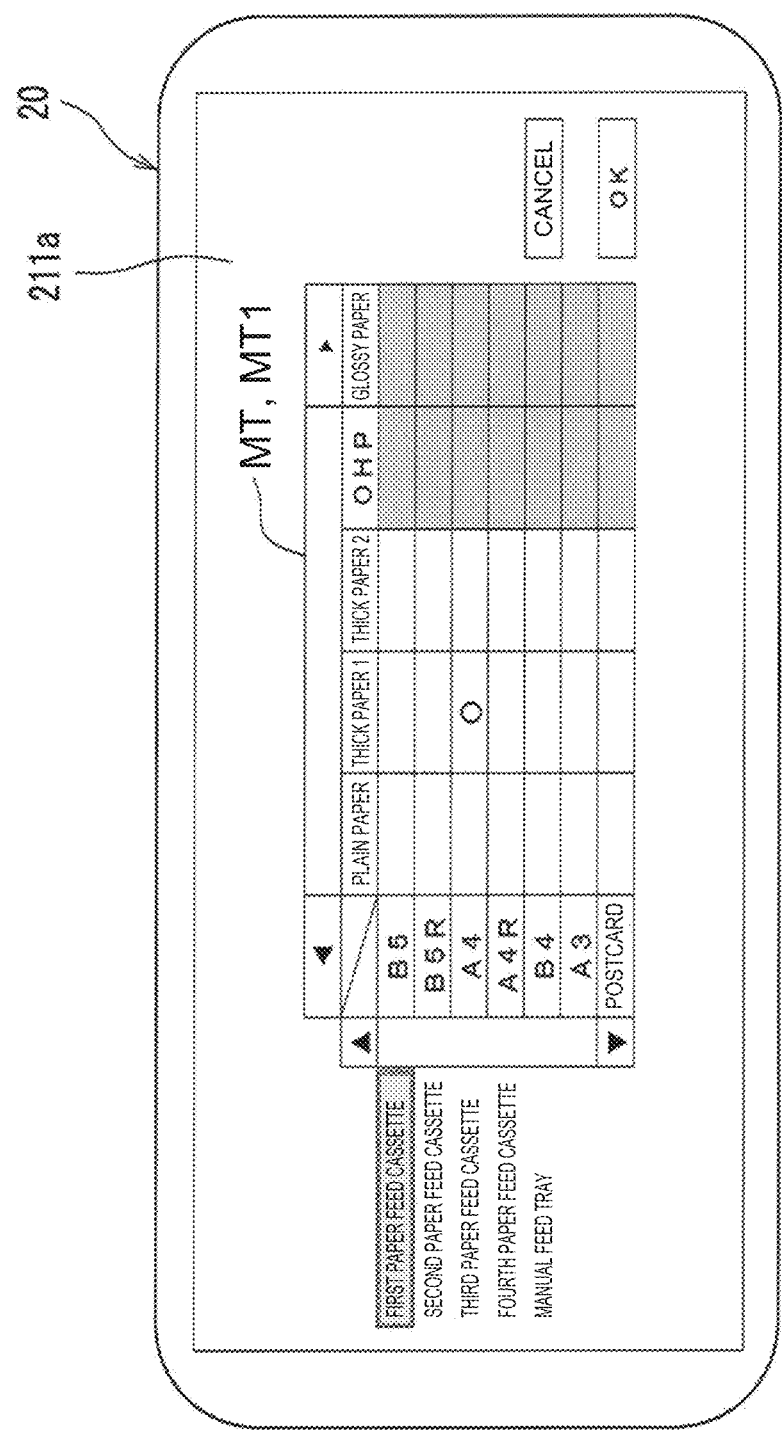
FIG. 6C is a front view illustrating the transition state where the setting item in the matrix table is set by the touch operation and the drag operation at the time of communicating with the image forming apparatus as the low-segment machine.
Figure 7A:
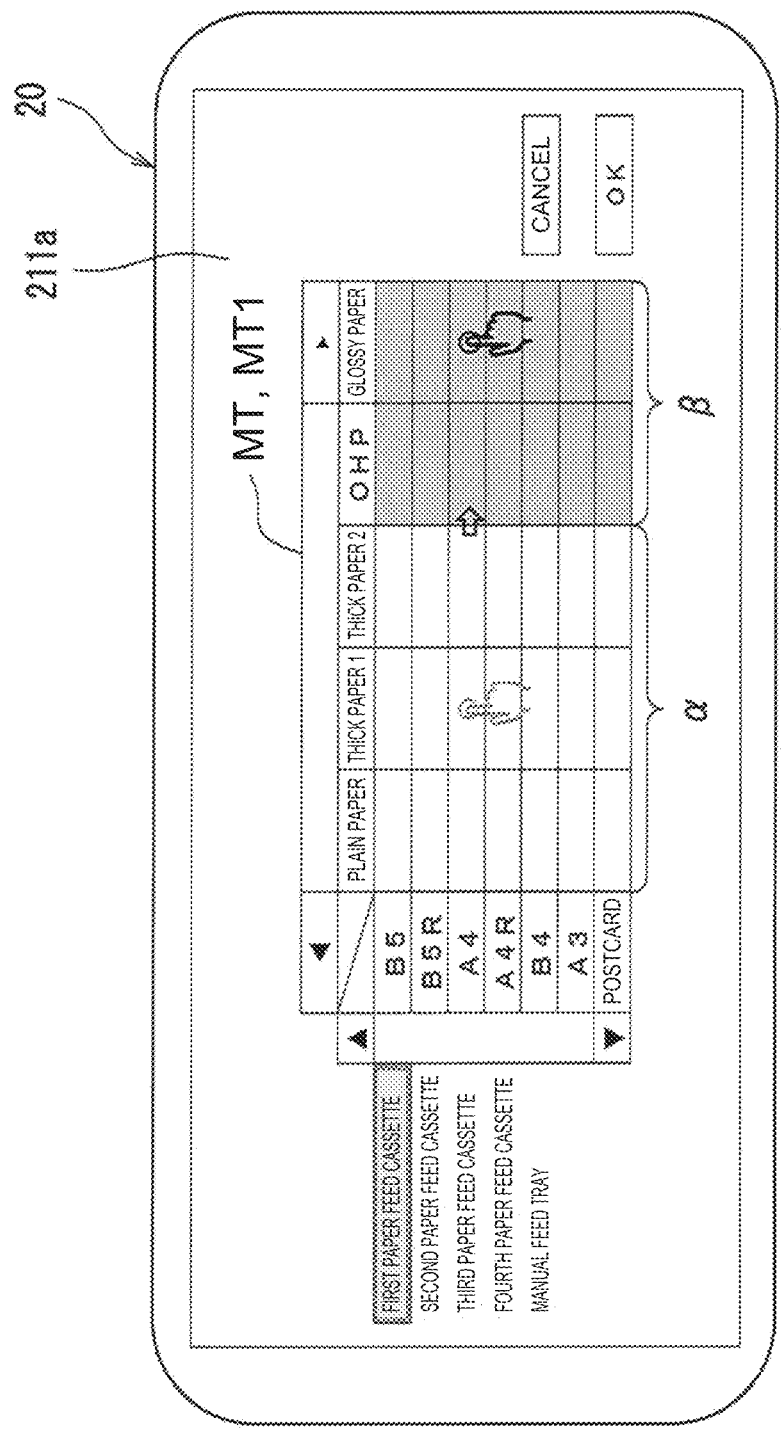
FIG. 7A is a front view illustrating a transition state where setting of the setting item in the matrix table by the touch operation and the drag operation is disallowed at the time of communicating with the image forming apparatus as the low-segment machine.
Figure 7B:
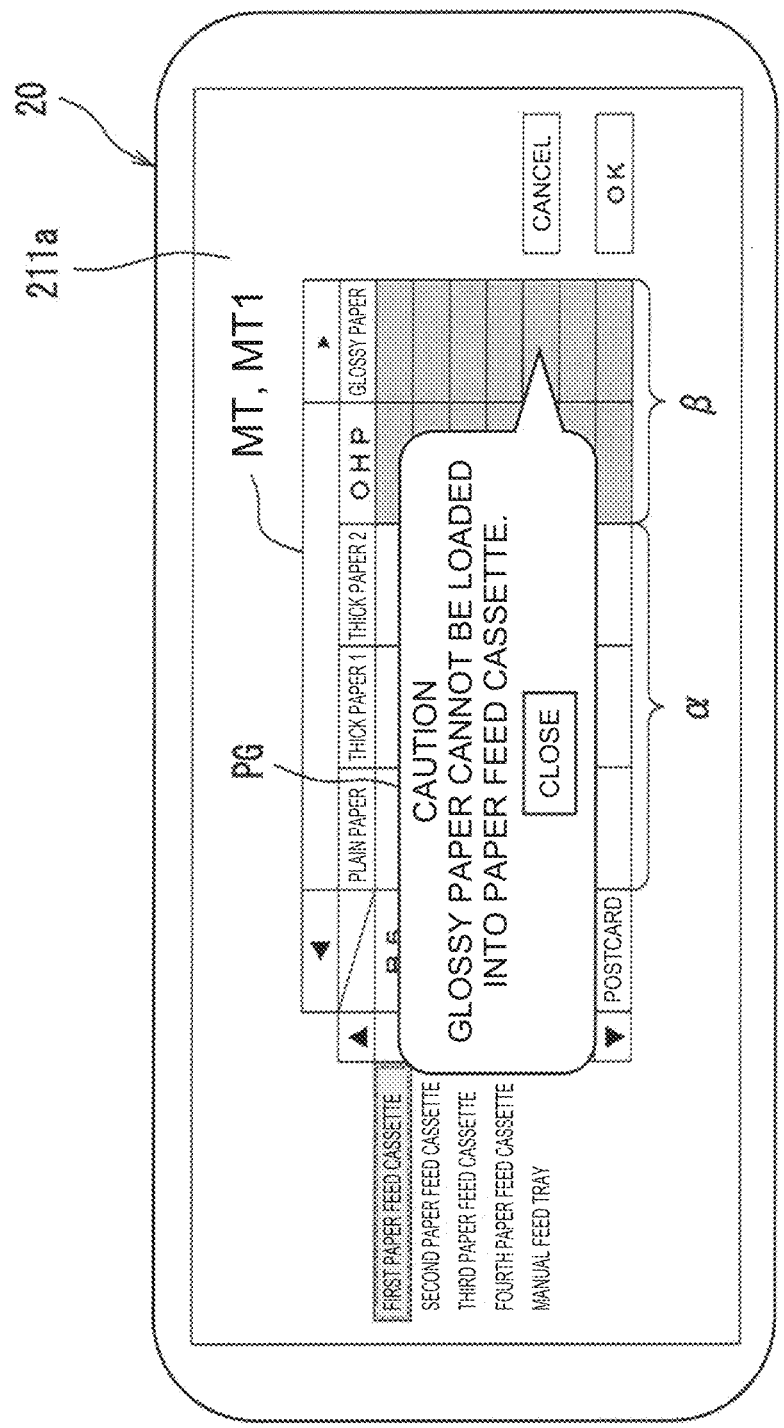
FIG. 7B is a front view illustrating the transition state where setting of the setting item in the matrix table by the touch operation and the drag operation is disallowed at the time of communicating with the image forming apparatus as the low-segment machine.

In addition, as illustrated in FIG. 6A to FIG. 6D, in the first matrix table MT1, when the user performs the touch operation of another cell or performs the drag operation of the index (the circle) (see FIG. 6B), the operation setting (a setting change) can simultaneously be made for the sheet size and the sheet type ("A4: plain paper"→"A4: thick paper 1") (see FIG. 6C). Next, when the user touches and operates the "OK" button (see FIG. 6D), the set sheet size and the set sheet type (A4 and thick paper 1 for the first paper feed cassette 121 in this example) are stored in the storage 23. In this example, only the sheet type is changed. However, only the sheet size or both of the sheet size and the sheet type can be changed.

As illustrated in FIG. 7A to FIG. 7C, the first matrix table MT1 has: a setting allowed cell area α where setting of the two types of the setting items (the sheet size and the sheet type) is allowed; and a setting disallowed cell area ß where setting of the two types of the setting items (the sheet size and the sheet type) is disallowed. A display mode differs between the setting allowed cell area α and the setting disallowed cell area ß. In this example, the setting disallowed cell area ß is displayed in light gray and has grayed-out display.

In the first matrix table MT1, when performing the touch operation of another cell or performing the drag operation of the index (the circle), the user performs the touch operation or the drag operation to the setting disallowed cell area ß (A4 and glossy paper for the third paper feed cassette 123 in this example) (see FIG. 7A), and releases his/her finger from the operation screen 211a to cancel the touch operation. Consequently, the controller 22 issues a warning that indicates a reason why setting of the two types of the setting items (the sheet size and the sheet type) is disallowed (see FIG. 7B). More specifically, as the reason for disallowing the setting, the controller 22 displays a message, "GLOSSY PAPER CANNOT BE LOADED INTO PAPER FEED CASSETTE." on a pop-up screen PG (see FIG. 7B). Then, the pop-up screen PG is closed when a "CLOSE" button is touched and operated or after a lapse of a predetermined time (see FIG. 7C).

Regarding Second Matrix Table

As illustrated in FIG. 8A to FIG. 8E, in the second matrix table MT2, first, the setting values (the sheet sizes for the sheet storages 12a, 12b) that correspond to the detection function and are received from the image forming apparatus 10(2) as the high-segment machine are displayed in the format of the second matrix table MT2. In this example, the setting values are the sizes (B5, A4, B4, A3, and A4) that are automatically set for the first paper feed cassette 121 to the fourth paper feed cassette 124 and the manual feed tray 125. In this case, the user does not have to select the sheet storages 12a, 12b (the first paper feed cassette 121 to the fourth paper feed cassette 124 and the manual feed tray 125) one by one (see FIG. 8A and FIG. 8B). In addition, the setting values (the sheet sizes for the sheet storages 12a, 12b), which are set by the user and received from the image forming apparatus 10(2), are displayed in the format of the second matrix table MT2 on the operation screen 211a (see FIG. 8A). At this time, in the case where the setting value by the user's operation setting does not exist, null display is provided (see FIG. 8B). Here, the sheet types for the sheet storages 12a, 12b may be set as preset values (default values) in the storage 23 in advance. In this case, the setting values of the preset values are displayed in the format of the second matrix table MT2.

Figure 8A:
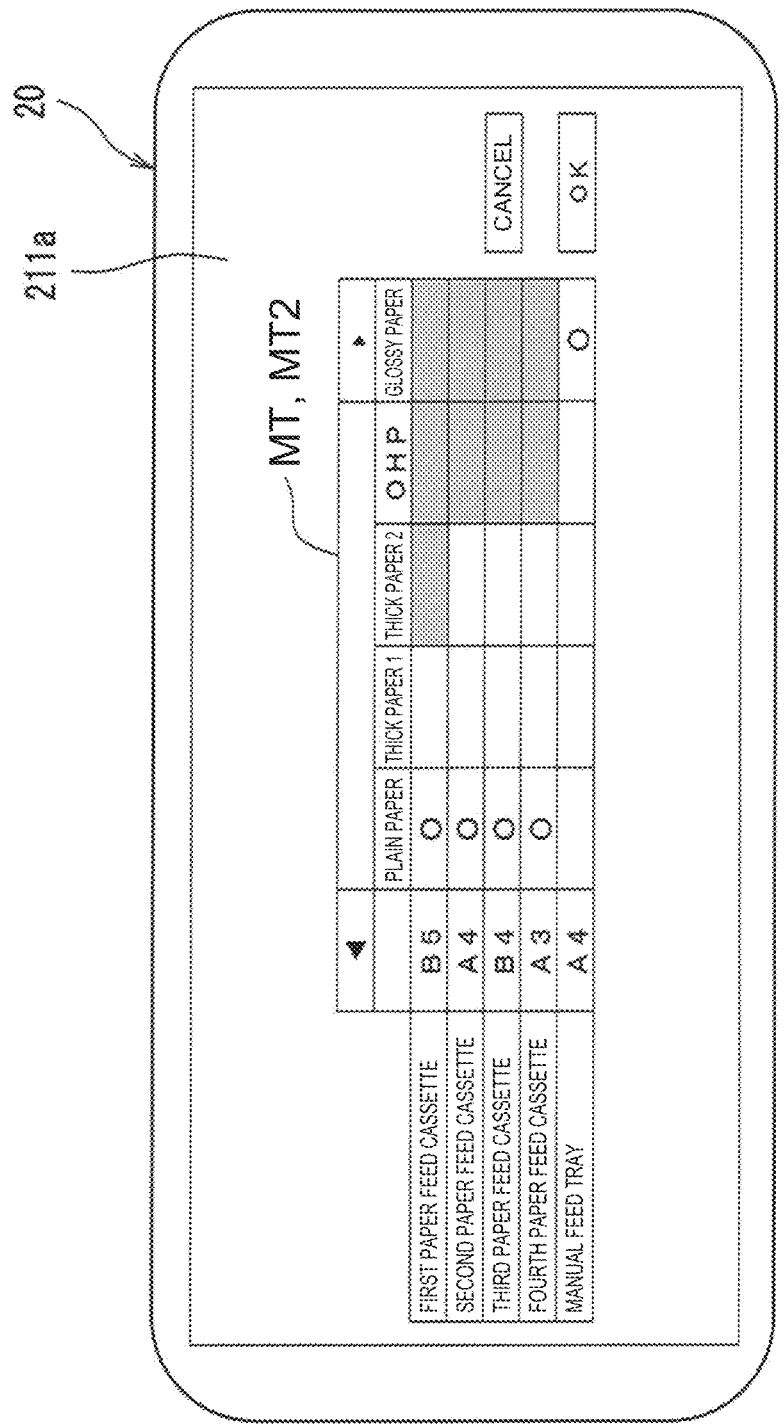
FIG. 8A is a front view illustrating a transition state where the setting item in the matrix table is set by the touch operation and the drag operation at the time of communicating with the image forming apparatus as the high-segment machine.
Figure 8B:
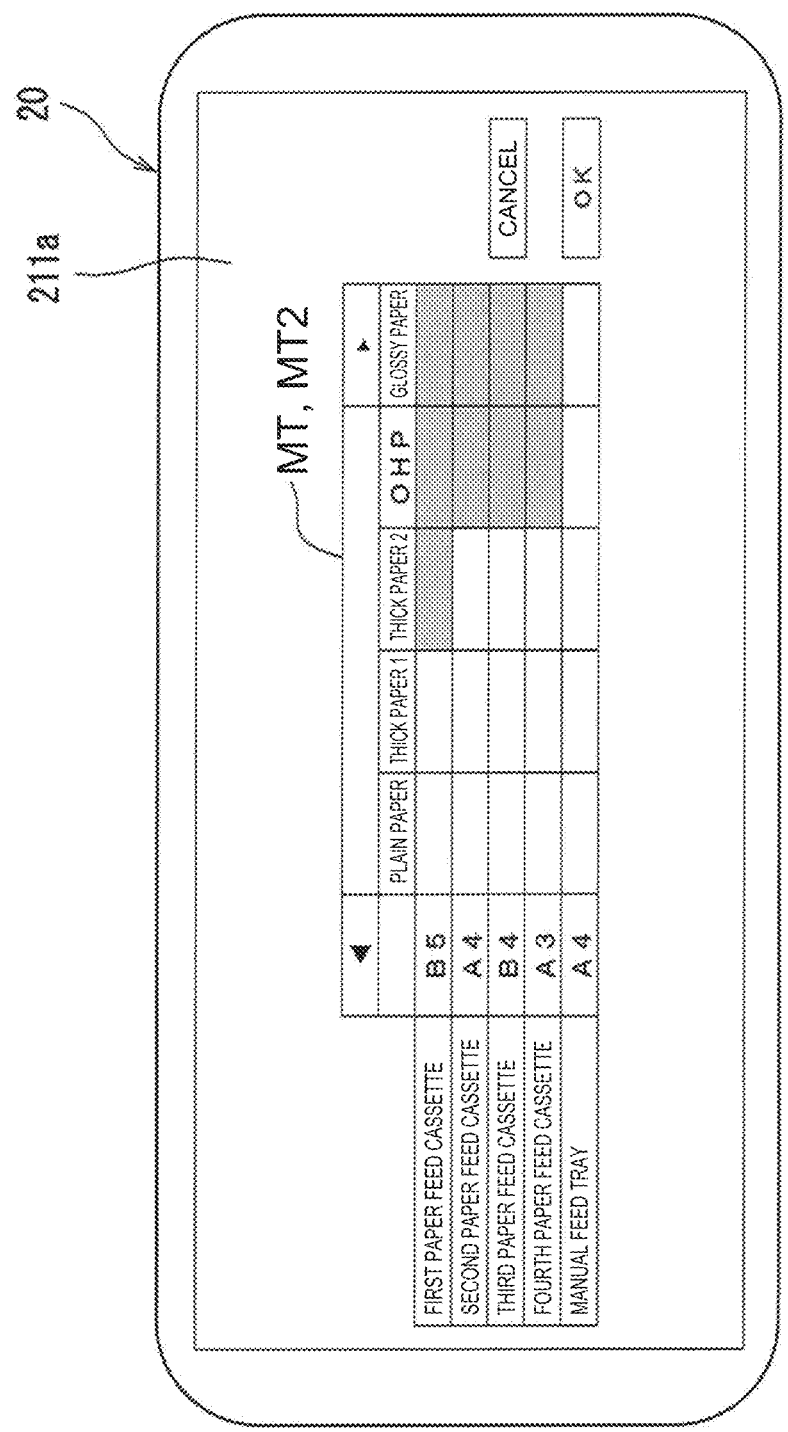
FIG. 8B is a front view illustrating the transition state where the setting item in the matrix table is set by the touch operation and the drag operation at the time of communicating with the image forming apparatus as the high-segment machine.
Figure 8D:
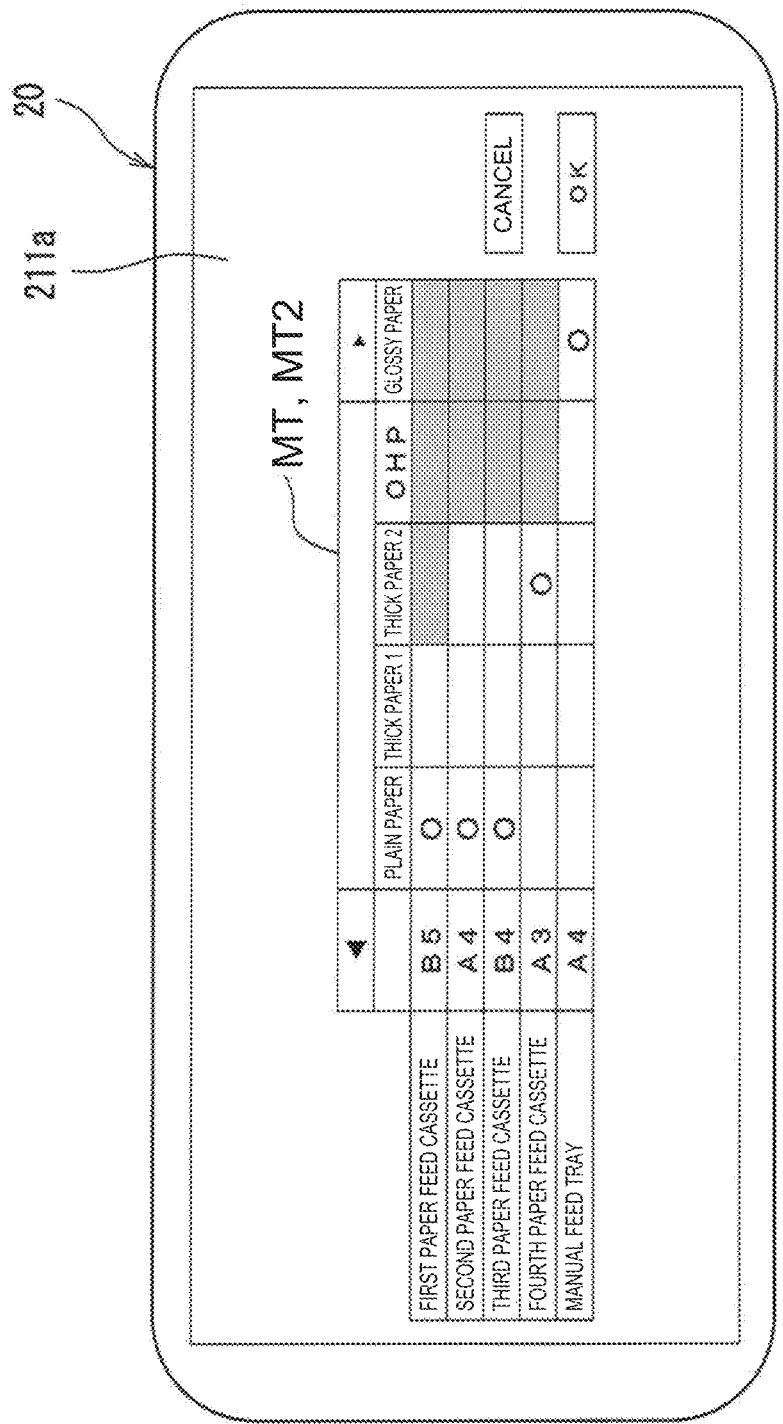
FIG. 8D is a front view illustrating the transition state where the setting item in the matrix table is set by the touch operation and the drag operation at the time of communicating with the image forming apparatus as the high-segment machine.
Figure 8E:
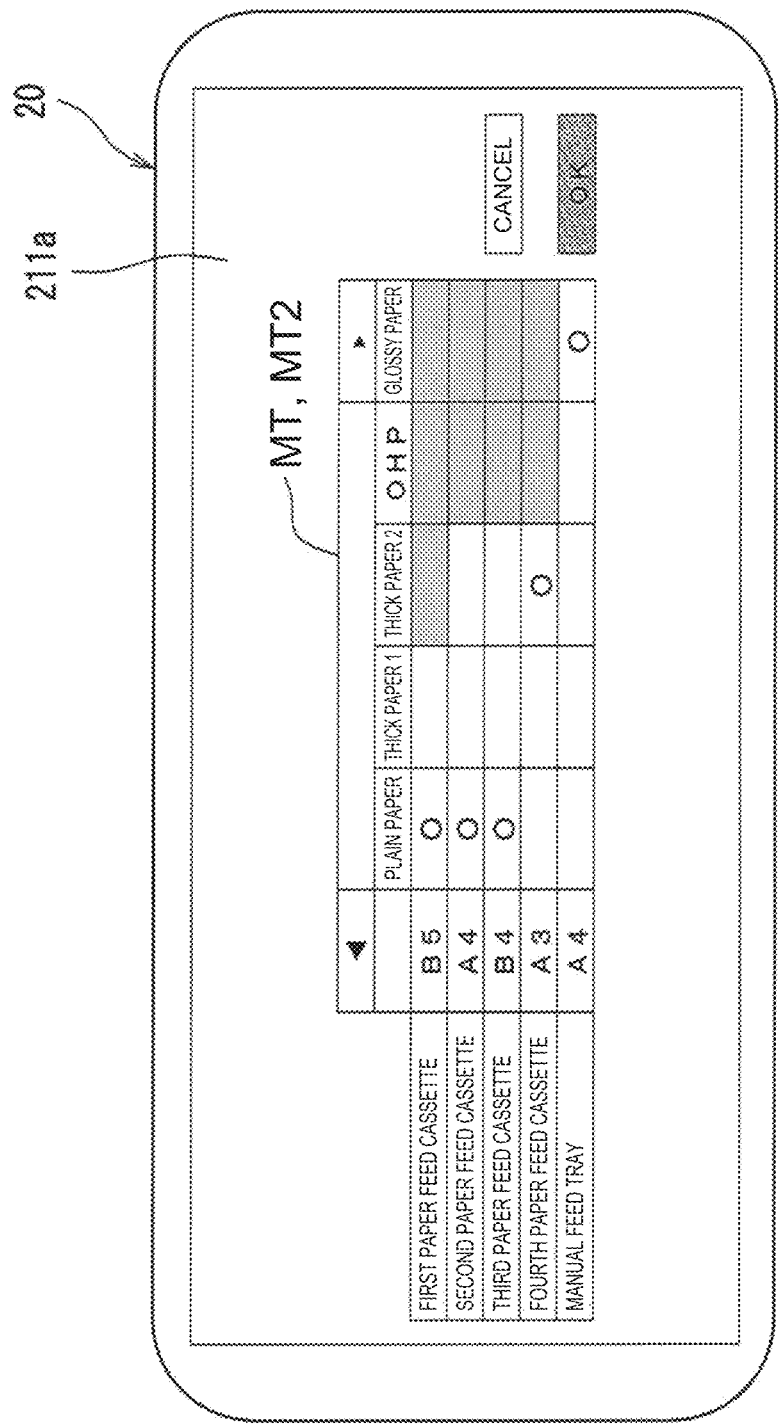
FIG. 8E is a front view illustrating the transition state where the setting item in the matrix table is set by the touch operation and the drag operation at the time of communicating with the image forming apparatus as the high-segment machine.
Figure 9B:
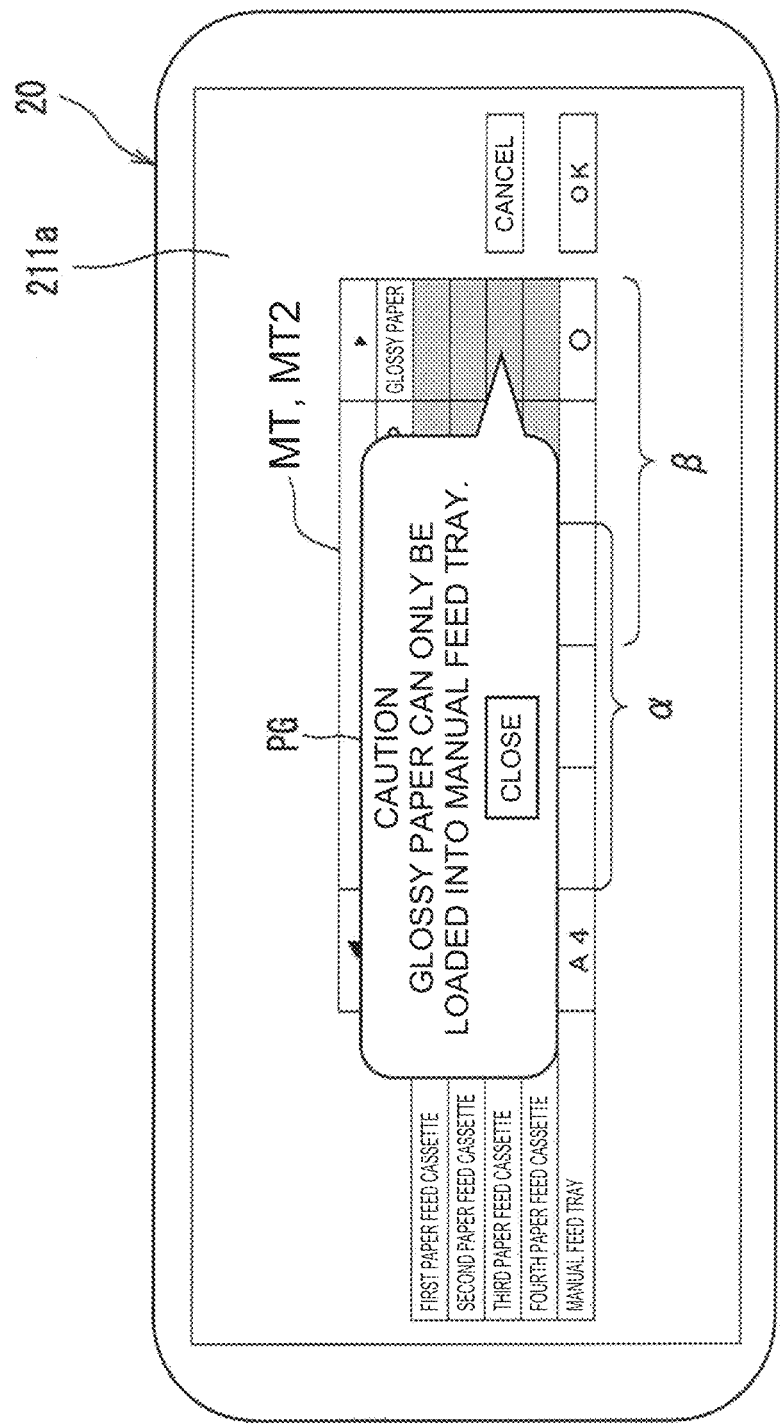
FIG. 9B is a front view illustrating the transition state where setting of the setting item in the matrix table by the touch operation and the drag operation is disallowed at the time of communicating with the image forming apparatus as the high-segment machine.

Next, in the second matrix table MT2, when the user performs the touch operation of another cell or performs the drag operation of the index (the circle) (see FIG. 8C), the operation setting (the setting change) can simultaneously be made for the sheet size and the sheet type ("A3: plain paper"→"A3: thick paper 2") (see FIG. 8D). Then, when the user touches and operates the "OK" button (see FIG. 8E), the set sheet storages 12a, 12b and the set sheet size and the set sheet type (A3 and thick paper 2 for the fourth paper feed cassette 124 in this example) are stored in the storage 23.

As illustrated in FIG. 9A to FIG. 9C, the second matrix table MT2 has: the setting allowed cell area α where setting of the two types of the setting items (the sheet size and the sheet type) is allowed; and the setting disallowed cell area ß where setting of the two types of the setting items (the sheet size and the sheet type) is disallowed. The display mode differs between the setting allowed cell area α and the setting disallowed cell area ß. In this example, the setting disallowed cell area ß is displayed in light gray and has the grayed-out display.

In the second matrix table MT2, when performing the touch operation of another cell or performing the drag operation of the index (the circle), the user performs the touch operation or the drag operation to the setting disallowed cell area ß (B5 and glossy paper for the first paper feed cassette 121 in this example) (see FIG. 9A), and releases his/her finger from the operation screen 211a to cancel the touch operation. Consequently, the controller 22 issues a warning that indicates a reason why setting of the two types of the setting items (the sheet size and the sheet type) is disallowed (see FIG. 9B). More specifically, as the reason for disallowing the setting, the controller 22 displays a message, "GLOSSY PAPER CAN ONLY BE LOADED INTO MANUAL FEED TRAY." on the pop-up screen PG (see FIG. 9B). Then, the pop-up screen PG is closed when the "CLOSE" button is touched and operated or after the lapse of the predetermined time (see FIG. 9C).

When setting of the two types of the setting items (the sheet sizes and the sheet types for the sheet storages 12a, 12b) is terminated in the mobile communication terminal 20, the controller 22 reads the two types of the setting items stored in the storage 23, and sends the two types of the setting items to respective one of the image forming apparatuses 10(1) to 10(n). Respective one of the image forming apparatuses 10(1) to 10(n) receives the two types of the setting items (the sheet sizes and the sheet types for the sheet storages 12a, 12b), which have been sent from the mobile communication terminal 20, and sets the received two types of the setting items.

As it has been described so far, according to this embodiment, the mobile communication terminal 20 wirelessly communicates with each of the image forming apparatuses 10(1) to 10(n). Then, on the operation screen 211a of the mobile communication terminal 20, the at least two types of the setting items (the sheet size and the sheet type in this example) among the plural types of the setting items for the image forming apparatuses 10(1) to 10(n) can simultaneously be set by the single touch operation. Thus, the at least two types of the setting items can be set at once. For example, the sheet sizes (A4 size, A3 size, and the like) and the sheet types (plain paper, thick paper, and the like) can be set for the sheet storages 12a, 12b at once. This can improve the operability of making the operation settings for the image forming apparatuses 10(1) to 10(n) by the user. In particular, in the case where the mobile communication terminal 20 communicates with the image forming apparatus 10(1) as the low-segment machine, it is possible for the user to set the various types of the setting items without the detection function on the operation screen 211a, which is easily operated for setting by the user, in the mobile communication terminal 20 without setting such setting items on the display screen 151 of the display 15, which is difficult for the user to operate for setting, in the image forming apparatus 10(1).

By the way, it has been requested to easily implement such a configuration that the user simultaneously sets the various types of the setting items on the operation screen 211a of the mobile communication terminal 20. In addition, in regard to the conventional hierarchical setting, there is a hassle of performing the setting again after the setting is advanced.

In this regard, in this embodiment, in the setting control step, the matrix table MT (MT1, MT2) with the cells, in which the two types of the setting items (the sheet size and the sheet type in this example) among the plural types of the setting items are sorted into the rows and the columns, is displayed on the operation screen 211a of the mobile communication terminal 20. Then, the touch operation of the cell in which the row and the column intersect each other is accepted.

In this way, with the simple configuration, it is possible to simultaneously set the two types of the setting items (the sheet size and the sheet type in this example). As a result, it is possible to easily adopt such a configuration that the user simultaneously sets the various types of the setting items on the operation screen 211a of the mobile communication terminal 20. In addition, the matrix table MT (MT1, MT2) allows the user to easily recognize the setting items in a list, and it is thus possible to reduce the hassle of performing the hierarchical setting again after such a setting is advanced as in the related art.

First Embodiment

By the way, in the image forming apparatuses 10(1) to 10(n), there is a combination of the two types of the setting items that should not be set specification-wise and/or functional-wise. In this case, the user possibly sets the combination that should not be set specification-wise and/or functional-wise.

In this regard, in this embodiment, the matrix table MT (MT1, MT2) has, according to the combinations of the two types of the setting items: the setting allowed cell area α (see FIG. 7A to FIG. 7C) where setting of the two types of the setting items (the sheet size and the sheet type in this example) is allowed; and the setting disallowed cell area ß (see FIG. 9A to FIG. 9C) where setting of the two types of the setting items (the sheet size and the sheet type in this example) is disallowed.

In this way, even when the user attempts to set the two types of the setting items (the sheet size and the sheet type in this example) in the setting disallowed cell area ß, it is possible to disallow setting of the two types of the setting items (the sheet size and the sheet type in this example) in the setting disallowed cell area ß. As a result, the user can avoid setting the combination that should not be set specification-wise and/or functional-wise.

By the way, in the case where the display mode is the same between the setting allowed cell area α and the setting disallowed cell area ß, it is difficult for the user to easily recognize a difference between the setting allowed cell area a and the setting disallowed cell area ß.

In this regard, in this embodiment, in the setting control step, the display mode of the setting allowed cell area α differs from the display mode of the setting disallowed cell area ß on the operation screen 211a of the mobile communication terminal 20 (see FIG. 7A to FIG. 7C and FIG. 9A to FIG. 9C). The display mode of the setting disallowed cell area ß is not limited to the illustrated display mode. Examples thereof are the grayed-out display, display in a different color from the setting allowed cell area α, display of the blinking setting disallowed cell area ß. In this example, the display mode of the setting disallowed cell area ß is the grayed-out display.

In this way, it is possible to clarify the difference between the display mode of the setting allowed cell area α and the display mode of the setting disallowed cell area ß. As a result, the user can easily recognize the difference between the setting allowed cell area α and the setting disallowed cell area ß.

By the way, the user cannot set the two types of the setting items when operating (performing the touch operation or the drag operation of) the cell, setting of which is disallowed. However, the user cannot recognize a reason why the setting item in the cell cannot be set.

In this regard, in this embodiment, in the setting control step, depending on the combination of the two types of the setting items (the sheet size and the sheet type in this example), in the case where the operation (the touch operation or the drag operation) of the cell, in which setting of the two types of the setting items is disallowed, is accepted on the operation screen 211a of the mobile communication terminal 20, the warning is issued to indicate the reason why setting of the two types of the setting items is disallowed (see FIG. 7B and FIG. 9B).

In this way, although the user cannot set the two types of the setting items (the sheet size and the sheet type in this example) by operating the cell, in which setting of the two types of the setting items is disallowed, the user can recognize the reason why the setting items in the cell cannot be set.

Second Embodiment

By the way, there is a case where plural types of display patterns exist for the two types of the setting items (the sheet size and the sheet type in this example).

Figure 10A:
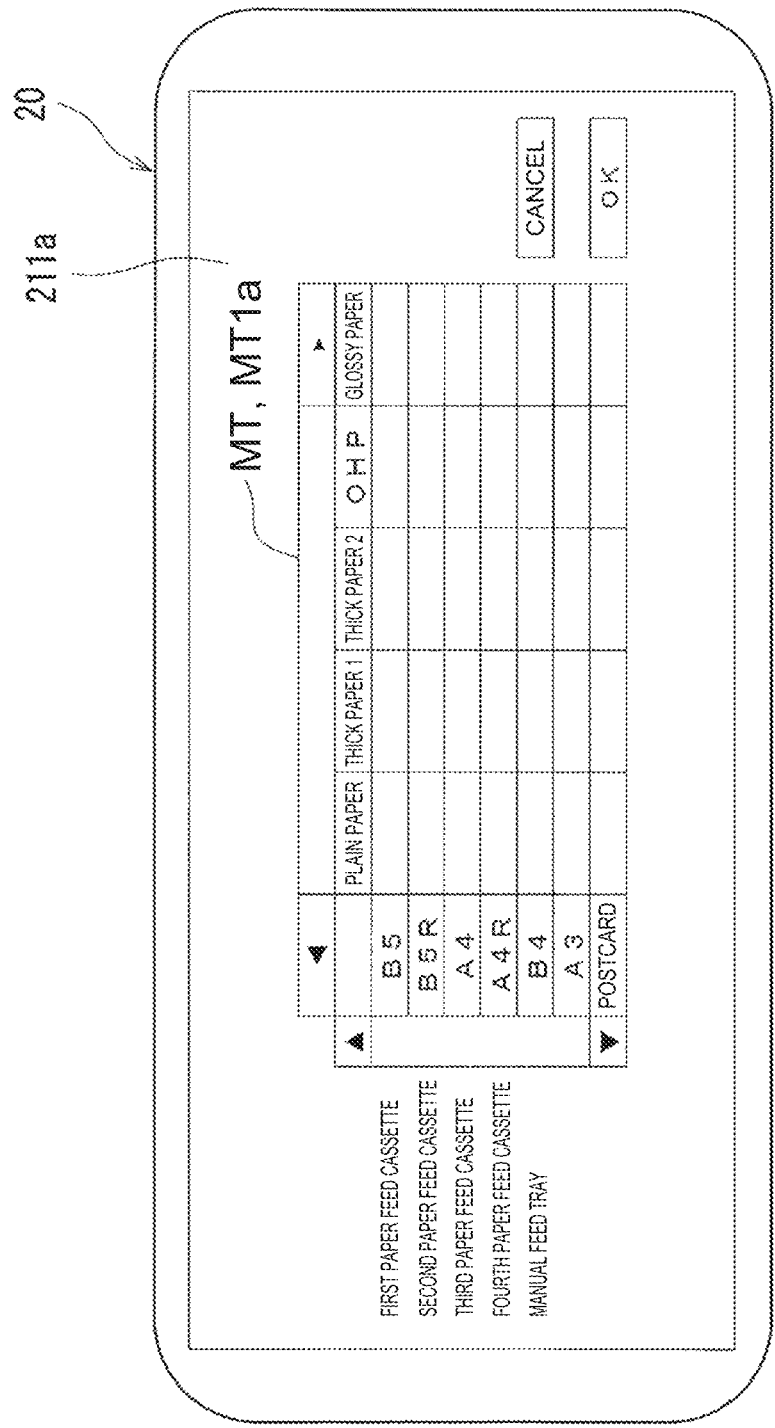
FIG. 10A is a front view illustrating an example of a display pattern of a first matrix table at the time of communicating with the image forming apparatus as the low-segment machine.
Figure 10B:
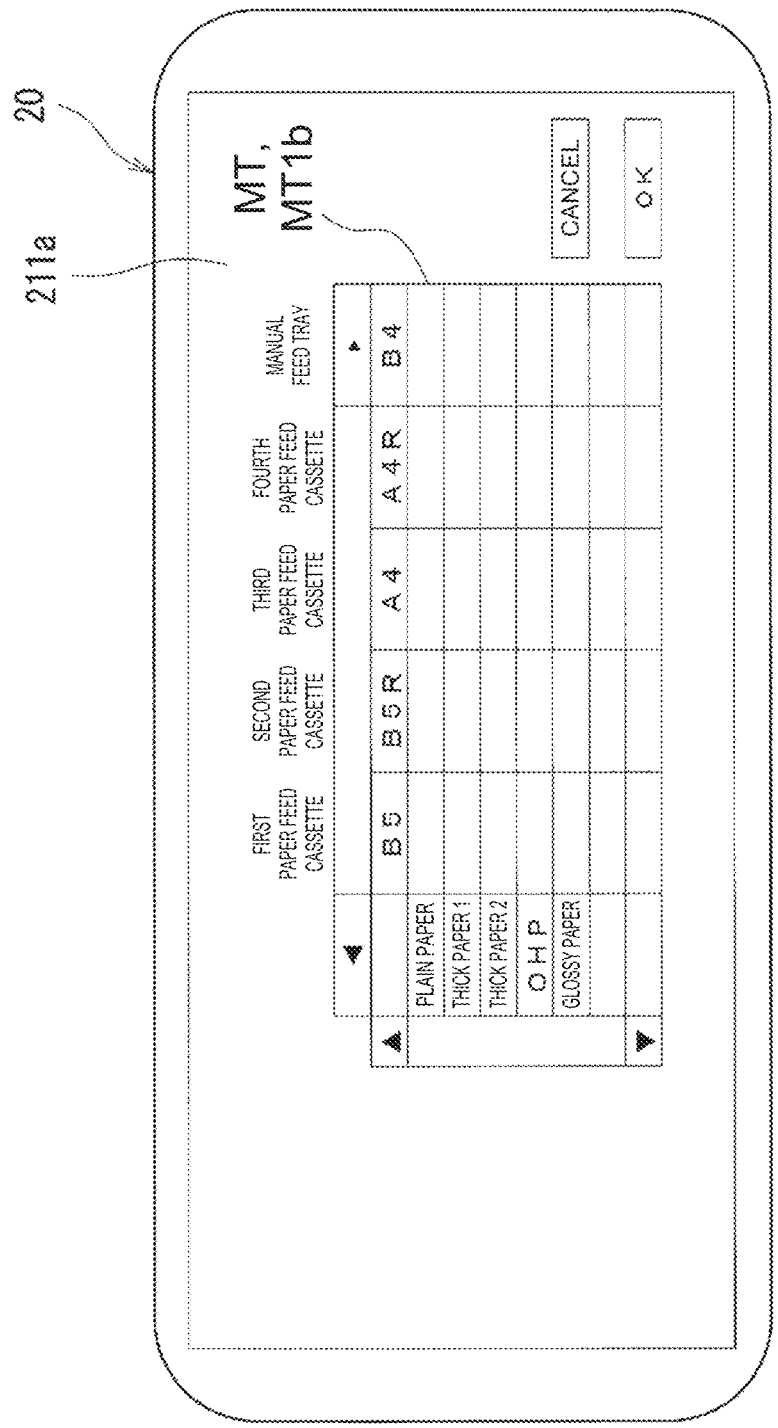
FIG. 10B is a front view illustrating another example of the display pattern of the first matrix table at the time of communicating with the image forming apparatus as the low-segment machine.
Figure 11A:
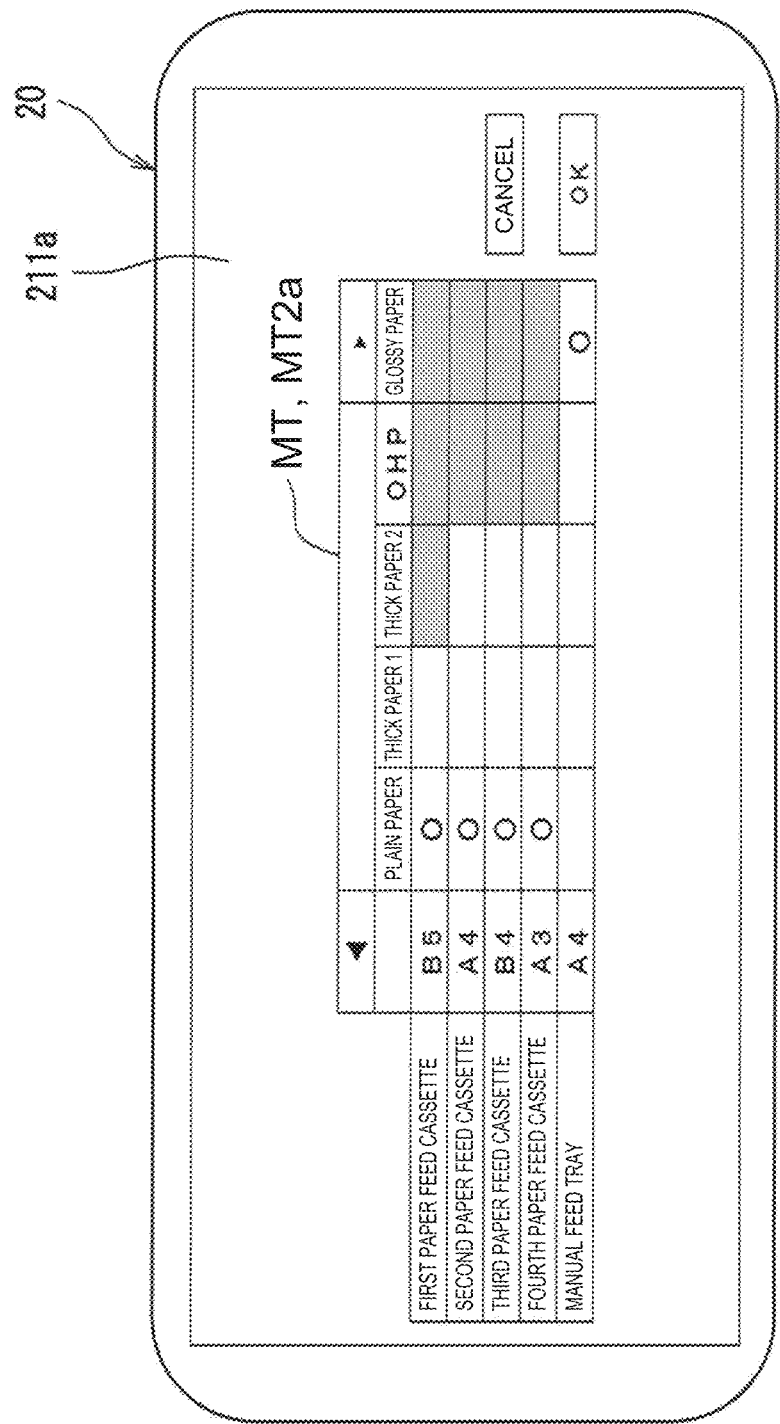
FIG. 11A is a front view illustrating an example of a display pattern of a second matrix table at the time of communicating with the image forming apparatus as the high-segment machine.

FIG. 10A and FIG. 10B are front views respectively illustrating an example and another example (MT1a, MT1b) of the display pattern of the first matrix table MT1, each of which is displayed on the operation screen 211a of the mobile communication terminal 20 at the time of communicating with the image forming apparatus 10(1) as the low-segment machine. FIG. 11A and FIG. 11B are front views respectively illustrating an example and another example (MT2a, MT2b) of the display pattern of the second matrix table MT2, each of which is displayed on the operation screen 211a of the mobile communication terminal 20 at the time of communicating with the image forming apparatus 10(2) as the high-segment machine.

As the plural matrix tables MT, in the first matrix table MT1 (MT1a) illustrated in FIG. 10A and the first matrix table MT1 (MT1b) illustrated in FIG. 10B, the rows and the columns are switched from each other. Similarly, in the second matrix table MT2 (MT2a) illustrated in FIG. 11A and the second matrix table MT2 (MT2b) illustrated in FIG. 11B, the rows and the columns are switched from each other. The plural matrix tables MT (the first matrix tables MT1 (MT1a, MT1b) and the second matrix tables MT2 (MT2a, MT2b)] are registered in the storage 23 in advance.

In this embodiment, in the selection control step, any one of the matrix tables MT [(MT1a, MT1b), (MT2a, MT2b)] in the plural (two in this example) types of the display patterns, which are registered in the storage 23 in advance, is selected on the operation screen 211a of the mobile communication terminal 20. In the setting control step, the matrix table MT [(MT1a, MT1b), (MT2a, MT2b)] in the display pattern that is selected in the selection control step is displayed on the operation screen 211a of the mobile communication terminal 20.

In this way, the user can select the matrix table MT in the desired display pattern that is selected from the matrix tables MT [(MT1a, MT1b), (MT2a, MT2b)] in the plural types of the display patterns.

By the way, there is a case where the is desired to freely layout the matrix tables MT in the plural types of the display patterns.

In this regard, in this embodiment, in the creation control step, the user creates the matrix tables MT [(MT1a, MT1b), (MT2a, MT2b)] in the plural types of the display patterns on the operation screen 211a of the mobile communication terminal 20. In the registration control step, the matrix tables MT [(MT1a, MT1b), (MT2a, MT2b)] in the plural types of the display patterns, which are created in the creation control step, are registered in advance. Then, in the selection control step, any one of the matrix tables MT [(MT1a, MT1b), (MT2a, MT2b)] in the plural types of the display patterns, which are registered in the registration control step, is selected on the operation screen 211a of the mobile communication terminal 20.

In this way, the user can freely create the matrix tables MT [(MT1a, MT1b), (MT2a, MT2b)] in the plural types of the desired display patterns. As a result, the user can make the operation settings in the matrix table MT in the desired display pattern.

Third Embodiment

By the way, the image forming apparatuses 10(1) to 10(n), each of which communicates with the mobile communication terminal 20, include: the image forming apparatus 10(1) that does not have the detection functions (the detection function of the sheet size in this example) corresponding to the plural types of the setting items; and the image forming apparatus 10(2) that has the detection function (the detection function of the sheet size in this example) corresponding to at least one of the plural types of the setting items. Of these, when the mobile communication terminal 20 communicates with the image forming apparatus 10(2) with the detection function, the user does not have to set the setting item (the sheet size in this example) that corresponds to the detection function.

In this regard, in this embodiment, the matrix tables MT include the first matrix table MT1 and the second matrix table MT2. The first matrix table MT1 is configured that the two types of the setting items (the sheet size and the sheet type) can be set therein in the case where the mobile communication terminal 20 communicates with the image forming apparatus 10(1) that does not have the detection functions (the detection function of the sheet size) corresponding to the plural types of the setting items. The second matrix table MT2 is configured that the setting item (the sheet size) corresponding to the detection function (the detection function of the sheet size) among the two types of the setting items (sheet size and the sheet type) cannot be set therein in the case where the mobile communication terminal 20 communicates with the image forming apparatus 10(2) that has the detection function (the detection function of the sheet size) corresponding to at least one setting item of the plural types of the setting items. Then, in the setting control step, when the mobile communication terminal 20 communicates with the image forming apparatus 10(1) that does not have the detection function (the detection function of the sheet size) in the communication control step, the first matrix table MT1 is displayed. Meanwhile, when the mobile communication terminal 20 communicates with the image forming apparatus 10(2) that has the detection function (the detection function of the sheet size) in the communication control step, the second matrix table MT2 is displayed.

As described above, when the mobile communication terminal 20 communicates with the image forming apparatus 10(1) that does not have the detection function (the detection function of the sheet size in this example), the user has to set the setting item (the sheet size) that corresponds to the detection function (the detection function of the sheet size in this example). Thus, it is possible to set the setting item (the sheet size) corresponding to the detection function (the detection function of the sheet size in this example) in the first matrix table MT1. Meanwhile, when the mobile communication terminal 20 communicates with the image forming apparatus 10(2) with the detection function, the user does not have to set the setting item (the sheet size) that corresponds to the detection function (the detection function of the sheet size in this example). Thus, it is possible to disallow setting of the setting item (the sheet size) corresponding to the detection function (the detection function of the sheet size in this example) in the second matrix table MT2.

Fourth Embodiment

In this embodiment, in the setting control step, the drag operation for the cell, in which the row and the column intersect each other, is accepted on the operation screen 211*a* of the mobile communication terminal 20 (see FIG. 6B and FIG. 8C).

In this way, it is possible to improve the operability at the time of making the operation settings of the two types of the setting items (the sheet size and the sheet type in this example).

Regarding Operation Example of Operation Assistance for Image Forming Apparatus by Mobile Communication Terminal Next, a description will hereinafter be made on an operation example of operation assistance for each of the image forming apparatuses 10(1) to 10(*n*) by the mobile communication terminal 20.

Figure 12:
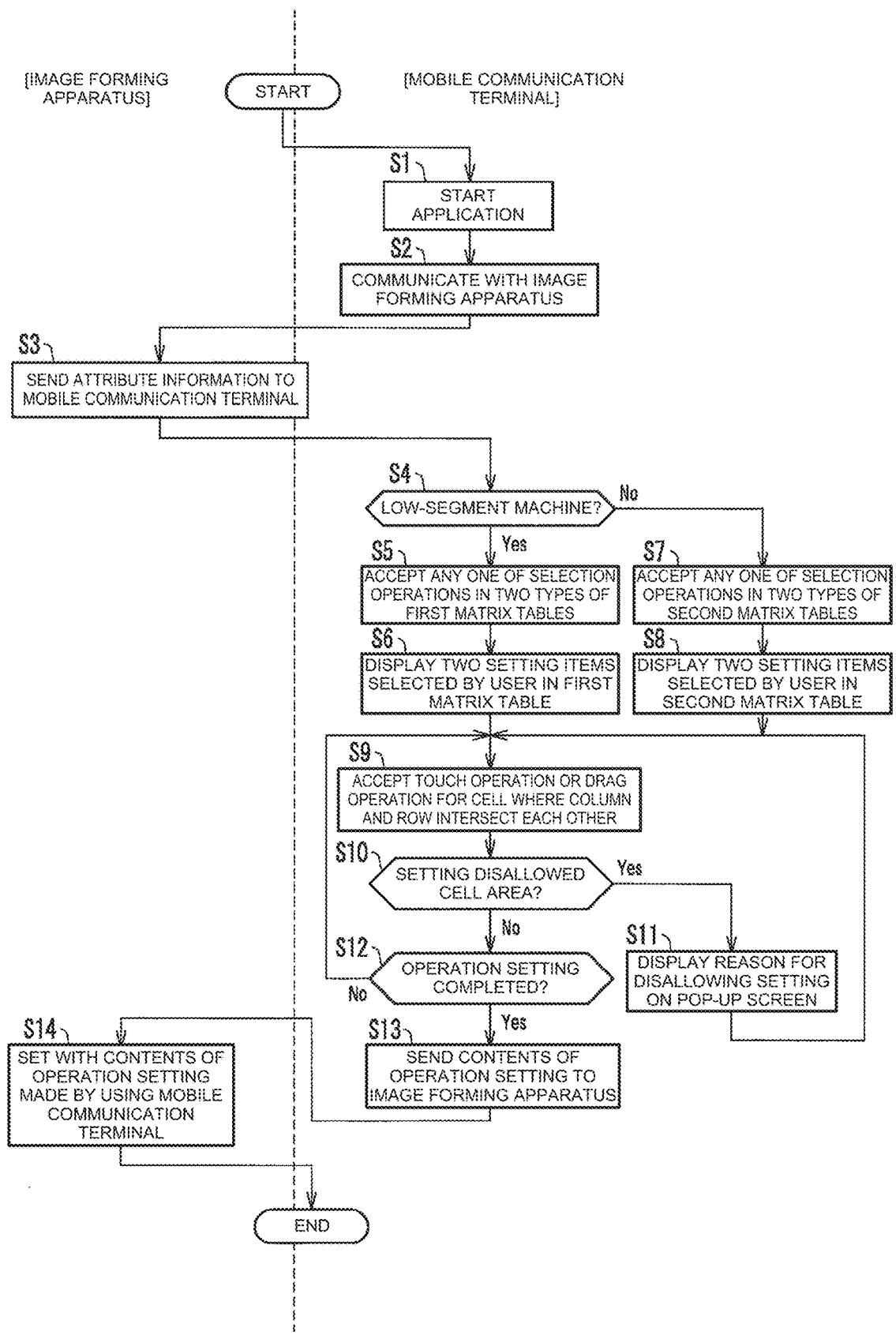
FIG. 12 is a flowchart illustrating a flow of operation of the operation assistance system for the image forming apparatus by a mobile communication terminal.

FIG. 12 is a flowchart illustrating a flow of operation of the operation assistance system 100 for the image forming apparatuses 10(1) to 10(*n*) by the mobile communication terminal 20.

Mobile Communication Terminal

In the operation example illustrated in FIG. 12, first, in the mobile communication terminal 20, when the controller 22 starts the application (S1), the controller 22 communicates with any image forming apparatus 10(*i*) (i is an integer from 1 to n) of the image forming apparatuses 10(1) to 10(*n*) (S2).

Image Forming Apparatus

Next, in the image forming apparatus 10(*i*), the controller 17 sends the attribute information to the mobile communication terminal 20 (S3). Here, the attribute information includes the segment of the image forming apparatus 10(*i*), the number of the drawers in the paper feed cassette, the sheet sizes, and the sheet types when the sheet types are set.

Mobile Communication Terminal

Next, in the mobile communication terminal 20, the controller 22 determines whether the image forming apparatus 10(*i*) is the low-segment machine (S4). If determining that the image forming apparatus 10(*i*) is the low-segment machine (S4: Yes), the controller 22 accepts the user's selection operation of any one of the first matrix tables MT1 (MT1*a*, MT1*b*) in the two types of the display patterns (S5), and displays the two setting items (the sheet size and the sheet type) in the first matrix table MT1, which has been selected by the user in S5 (SG). On the other hand, if determining that the image forming apparatus 10(*i*) is the high-segment machine (S4: No), the controller 22 accepts the user's selection operation of any one of the second matrix tables MT2 (MT2*a*, MT2*b*) in the two types of the display patterns (S7), and displays the two setting items (the sheet size and the sheet type) in the second matrix table MT2, which has been selected by the user in S7 (S8).

Next, the controller 22 accepts the touch operation or the drag operation of the cell, in which the row and the column intersect each other, in the displayed first matrix table MT1 or the displayed second matrix table MT2 (S9), and determines whether the operation position of the touch operation or the drag operation is located in the setting disallowed cell area ß (S10). If determining that the operation position of the touch operation or the drag operation is located in the setting disallowed cell area ß (S10: Yes), the controller 22 displays the reason for disallowing the setting on the pop-up screen PG (S11), and the processing proceeds to S9. On the other hand, if determining that the operation position of the touch operation or the drag operation is located in the setting allowed cell area a (S10: No), the controller 22 determines whether the operation setting is completed (S12).

Next, if the controller 22 determines that the operation setting continues (S12: No), the processing proceeds to S9. On the other hand, if determining that the operation setting is completed (S12: Yes), the controller 22 sends a content of the operation setting to the image forming apparatus 10(*i*) (S13), and the processing proceeds to S14.

Image Forming Apparatus

Next, in the image forming apparatus 10(*i*), the controller 17 sets the content of the operation setting, which has been made by the mobile communication terminal 20, to the image forming apparatus 10(*i*) (S14).

OTHER EMBODIMENTS

In the embodiment that has been described so far, the sheet size and the sheet type are exemplified as the two types of the setting items. However, other two types of the setting items may also be used. In addition, the content of the operation setting that is made by the mobile communication terminal 20 is stored in the storage 23 of the mobile communication terminal 20. However, the content of the operation setting may be stored in the storage 18 of the image forming apparatus 10 or in the storage 31 of the server 30. Furthermore, the image forming apparatus that is configured to have a centimeter specification is used as each of the image forming apparatuses 10(1) to 10(*n*). However, it is needless to say that an image forming apparatus that is configured to have an inch specification may also be used.

The present invention is not limited to the embodiments that have been described so far, and may be implemented in various aspects. Therefore, such embodiments are merely examples in all respects and should not be construed as limiting. The scope of the present invention is indicated by the claims, and is not limited to the foregoing description. Further, all modifications and variations belonging to the equivalent scope of the claims are within the scope of the present invention.

What is claimed is:

1. An operation assistance system that assists with making an operation setting of an image forming apparatus by using a mobile communication terminal, wherein
the mobile communication terminal wirelessly communicates with the image forming apparatus, and, on an operation screen of the mobile communication terminal, at least two types of setting items among a plurality of types of setting items for the image forming apparatus are simultaneously set by receiving a single touch operation,
a matrix table with cells, in which the at least two types of setting items are sorted into rows and columns, is displayed on the operation screen of the mobile communication terminal, and the single touch operation of a cell in which a row and a column intersect each other is accepted, and
the matrix table has, according to a combination of the at least two types of setting items: a setting allowed cell area where setting of the at least two types of setting items is allowed, and a setting disallowed cell area where setting of the at least two types of setting items is disallowed.

2. An operation assistance method that assists with making an operation setting of an image forming apparatus by using a mobile communication terminal, the operation assistance method comprising:
causing the mobile communication terminal to wirelessly communicate with the image forming apparatus; and
on an operation screen of the mobile communication terminal, simultaneously setting at least two types of setting items among a plurality of types of setting items for the image forming apparatus by receiving a single touch operation, wherein
a matrix table with cells, in which the at least two types of setting items are sorted into rows and columns, is displayed on the operation screen of the mobile communication terminal, and the single touch operation of a cell in which a row and a column intersect each other is accepted, and
the matrix table has, according to a combination of the at least two types of setting items: a setting allowed cell area where setting of the at least two types of setting items is allowed, and a setting disallowed cell area where setting of the at least two types of setting items is disallowed.

3. The operation assistance method for the image forming apparatus according to claim 2, wherein
a display mode of the setting allowed cell area differs from a display mode of the setting disallowed cell area on the operation screen of the mobile communication terminal.

4. The operation assistance method for the image forming apparatus according to claim 2, wherein
on the operation screen of the mobile communication terminal, depending on the combination of the at least two types of setting items, in a case where an operation of a cell, in which setting of the at least two types of setting items is disallowed, is accepted, a warning is issued to indicate a reason as to why the setting of the at least two types of setting items is disallowed.

5. The operation assistance method for the image forming apparatus according to claim 2, further comprising:
selecting any one of a plurality of matrix tables that are displayed in a plurality of display patterns, which are registered in advance, on the operation screen of the mobile communication terminal, wherein
on the operation screen of the mobile communication terminal, the matrix table is displayed in one of the plurality of display patterns.

6. The operation assistance method for the image forming apparatus according to claim 2, further comprising:
creating a plurality of matrix tables, including the matrix table, that are displayed in a plurality of display patterns on the operation screen of the mobile communication terminal by a user;
registering the plurality of matrix tables; and
on the operation screen of the mobile communication terminal, selecting any one of the plurality of matrix tables, which have been registered, wherein
on the operation screen of the mobile communication terminal, the matrix table is displayed in one of the plurality of display patterns.

7. The operation assistance method for the image forming apparatus according to claim 2, wherein
the matrix tables comprises a first matrix table and a second matrix table,
in the first matrix table at least two types of setting items are settable in a case where the mobile communication terminal communicates with the image forming apparatus that does not have any detection function corresponding to the plurality of types of setting items,
in the second matrix a setting item corresponding to a detection function among the at least two types of setting items is not settable in a case where the mobile communication terminal communicates with the image forming apparatus that has the detection function corresponding to at least one type of setting item in the plurality of types of setting items, and
the first matrix table is displayed when the mobile communication terminal communicates with the image forming apparatus that does not have any detection function, and the second matrix table is displayed when the mobile communication terminal communicates with the image forming apparatus that has the detection function.

8. The operation assistance method for the image forming apparatus according to claim 2, wherein
a drag operation of the cell, in which the row and the column intersect each other, is accepted on the operation screen of the mobile communication terminal.

9. A computer-readable recording medium recording an operation assistance program for the image forming apparatus that causes a computer to execute each step in the operation assistance method for the image forming apparatus according to claim 2.

10. An operation assistance method that assists with making an operation setting of an image forming apparatus by using a mobile communication terminal, the operation assistance method comprising:
causing the mobile communication terminal to wirelessly communicate with the image forming apparatus;
on an operation screen of the mobile communication terminal, simultaneously setting at least two types of setting items among a plurality of types of setting items for the image forming apparatus by receiving a single touch operation, wherein
a matrix table with cells, in which the at least two types of setting items are sorted into rows and columns, is displayed on the operation screen of the mobile communication terminal, and the single touch operation of a cell in which a row and a column intersect each other is accepted; and selecting any one of a plurality of matrix tables that are displayed in a plurality display patterns, which are registered in advance, on the operation screen of the mobile communication terminal, wherein on the operation screen of the mobile communication terminal, the matrix table is displayed in of the plurality of display patterns.

\* \* \* \* \*